US012777241B2

(12) United States Patent
Liu

(10) Patent No.: US 12,777,241 B2
(45) Date of Patent: Oct. 27, 2026

(54) FILMING PARAMETER CONFIGURATION

(71) Applicant: Tencent Technology (Shenzhen) Company Limited, Shenzhen (CN)

(72) Inventor: Huilong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 99 days.

(21) Appl. No.: 18/779,673

(22) Filed: Jul. 22, 2024

(65) Prior Publication Data

US 2024/0380966 A1 Nov. 14, 2024

Related U.S. Application Data

(63) Continuation of application No. PCT/CN2023/092982, filed on May 9, 2023.

(30) Foreign Application Priority Data

May 13, 2022 (CN) ......................... 202210525942.6

(51) Int. Cl.
*H04N 23/61* (2023.01)
*G06T 15/20* (2011.01)

(52) U.S. Cl.
CPC ............. *H04N 23/61* (2023.01); *G06T 15/20* (2013.01)

(58) Field of Classification Search
CPC ...... H04N 23/61; H04N 23/60; H04N 23/617; G06T 15/20; G06T 19/006
See application file for complete search history.

(56) References Cited

U.S. PATENT DOCUMENTS

| | | | | |
|---|---|---|---|---|
| 2005/0091019 A1 | 4/2005 | Clavadetscher | | |
| 2012/0007943 A1* | 1/2012 | Tytgat | G01B 11/22 | 348/E7.083 |
| 2012/0188452 A1* | 7/2012 | Keiser | H04N 5/2224 | 348/559 |
| 2017/0249752 A1* | 8/2017 | Kotake | G06T 7/73 | |

FOREIGN PATENT DOCUMENTS

| | | | |
|---|---|---|---|
| CN | 108289220 | A | 7/2018 |
| CN | 110675348 | A | 1/2020 |
| CN | 112308103 | A | 2/2021 |
| CN | 112311965 | A | 2/2021 |
| CN | 113824882 | A | 12/2021 |
| CN | 114040090 | A | 2/2022 |
| JP | 2008217220 | A | 9/2008 |

OTHER PUBLICATIONS

Jul. 27, 2023—(CN) International Search Report of PCT/CN2023/092982.

* cited by examiner

*Primary Examiner* — Mekonnen D Dagnew
(74) *Attorney, Agent, or Firm* — Banner & Witcoff, Ltd.

(57) ABSTRACT

Examples of this application disclose a filing parameter configuration method, apparatus, a device, a storage medium, and a product. The method comprises obtaining photographing parameters of a camera; determining, based on the photographing parameters of the camera and a reference dataset, target virtual scene parameters corresponding to virtual content to be photographed by the camera; and displaying the virtual content according to the target virtual scene parameter.

17 Claims, 5 Drawing Sheets

FILMING PARAMETER CONFIGURATION

CROSS-REFERENCE TO RELATED APPLICATIONS

This application is a continuation application of PCT Application PCT/CN2023/092982, filed May 9, 2023, which claims priority to Chinese Patent Application No. 202210525942.6 filed on May 13, 2022, each entitled "PARAMETER CONFIGURATION METHOD AND APPARATUS, DEVICE, STORAGE MEDIUM, AND PRODUCT", and each is incorporated herein by reference in its entirety.

FIELD OF THE TECHNOLOGY

This application relates to the field of computer technologies, and specifically, to a filming parameter configuration method and apparatus, a device, a storage medium, and a product.

BACKGROUND OF THE DISCLOSURE

With the progress of scientific and technological research, virtual film production technologies are widely applied to processes such as video photographing, film production, and advertisement photographing. A virtual film production technology usually makes a photographed video or movie more realistic by combining a real scene and a virtual scene (e.g., combining a depth of field effect of the real scene and a depth of field effect of the virtual scene).

SUMMARY

Examples of this application provide a parameter configuration method and apparatus, a device, a storage medium, and a product, to improve configuration efficiency of virtual scene parameters.

According to an aspect, an example of this application provides a parameter configuration method, comprising:

- obtaining photographing parameters of a target camera device;
- determining, according to the photographing parameters of the target camera device and a reference dataset, target virtual scene parameters corresponding to virtual content to be photographed by the target camera device, the reference dataset being preset and including a correspondence between reference photographing parameters and virtual scene parameters;
- displaying the to-be-photographed virtual content according to the target virtual scene parameters; and
- causing the target camera device to photograph the virtual content.

In addition, this application provides a computing device, comprising:

- one or more processors configured to load and execute a computer program; and
- a computer-readable storage medium, having a computer program stored therein, the computer program, when executed by the one or more processors, implementing the foregoing parameter configuration method.

Also, this application provides a non-transitory computer-readable storage medium storing instructions, when executed, implement the foregoing parameter configuration method.

In addition, this application provides a computer program product or a computer program. The computer program product or the computer program includes computer instructions. The computer instructions are stored in a computer-readable storage medium. A processor of a computer device reads the computer instructions from the computer-readable storage medium, and executes the computer instructions, to cause the computer device to perform the foregoing parameter configuration method.

In the examples of this application, by determining, according to the photographing parameters of the target camera device and a preset reference dataset, target virtual scene parameters corresponding to virtual content to be photographed by the target camera device, and displaying the to-be-photographed virtual content according to the target virtual scene parameters, the target virtual scene parameters may be changed in real time according to the photographing parameters of the target camera device, to display the to-be-photographed virtual content. Therefore, the target camera device can almost simultaneously photograph a real scene and virtual content that corresponds to the real scene and that is displayed on a display device, which has high real-time performance. In addition, a transition between the real scene and the virtual content that is displayed according to the virtual scene parameters can be made smooth in an image photographed by the target camera device according to the photographing parameters of the target camera device.

BRIEF DESCRIPTION OF THE DRAWINGS

To describe the technical solutions in the examples of this application or in the related art more clearly, the following briefly introduces the accompanying drawings for describing the examples or the related art. Apparently, the accompanying drawings in the following description show merely some examples of this application, and a person of ordinary skill in the art may still derive other drawings from the accompanying drawings without creative efforts.

DESCRIPTION OF EXAMPLES

Figure 1:
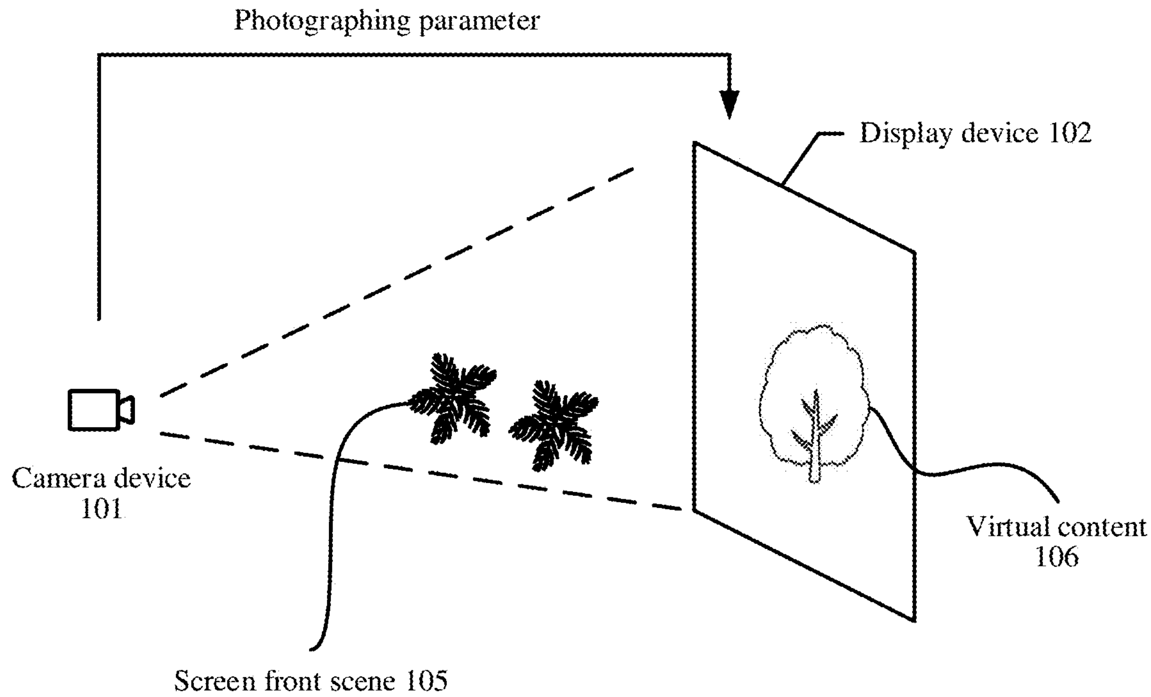
FIG. 1 is a diagram of a scene of virtual film production according to an example of this application.

The following clearly and completely describes the technical solutions in the examples of this application with reference to the accompanying drawings in the examples of this application. Apparently, the described examples are some of the examples of this application rather than all of the examples. All other examples obtained by a person of ordinary skill in the art based on the examples of this application without creative efforts shall fall within the protection scope of this application.

In a process of virtual film production, on a photographing site, a film producer usually adjusts a virtual scene parameter (e.g., a photographing parameter of a virtual camera device) according to a depth of field effect in a real scene (or a real space) presented in a camera lens as seen by an unaided eye, so that the depth of field effect of the real scene and a depth of field effect of a virtual scene (or a virtual space) in a light-emitting diode (LED) curtain wall remain connected. During this adjustment, real-time performance may be poor, and a depth of field transition between the real scene and the virtual scene may be unsmooth.

This application relates to a virtual film production technology implemented through a computer technology. The following briefly describes related terms:

Virtual film production: It refers to a series of computer-assisted film production and visual film production methods. Virtual film production combines virtual reality and augmented reality with a computer-generated imagery (CGI) technology and a game engine technology, so that producers can see scenes that are obtained by fusing a virtual scene and a real scene and that are spread out in front of the producers, as if the scenes were photographed in the real scene.

LED curtain wall: A large LED screen is configured to display virtual content on a photographing site of virtual film production.

Screen front scene: There is an actual photographing prop in front of the LED curtain wall.

On-site photographing camera: An on-site photographing camera in virtual film production captures fused pictures of an LED screen and a screen front scene simultaneously.

Virtual scene: It is a digital scene made in a game engine according to an artist requirement or a real scene.

Real scene (on-site scene): It is a real prop or scene built in virtual film production.

In addition, the examples of this application further relate to Artificial Intelligence (AI). The following briefly describes related terms and concepts of AI:

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big application processing technology, an operating/interaction system, and electromechanical integration. AI software technologies mainly include several major directions such as a computer vision technology, a speech processing technology, a natural language processing technology, and machine learning/deep learning.

Machine learning is a multi-field interdiscipline, and relates to a plurality of disciplines such as the probability theory, statistics, the approximation theory, convex analysis, and the algorithm complexity theory. Machine learning specializes in studying how a computer simulates or implements a human learning behavior to obtain new knowledge or skills, and reorganize an existing knowledge structure, to keep improving its performance. Machine learning is the core of AI, is a basic way to make the computer intelligent, and is applied to various fields of AI. Machine learning/deep learning generally includes technologies such as an artificial neural network, a belief network, reinforcement learning, transfer learning, inductive learning, and learning from demonstrations.

Deep learning: The concept of deep learning is originated from research about artificial neural networks. A multi-layer perceptron including a plurality of hidden layers is one of deep learning structures. During the deep learning, an attribute type or feature is represented by combining lower-layer features into a more abstract higher layer, to find distributed feature representation of data. The examples of this application mainly relate to training an initial model by using a reference dataset to obtain a virtual scene parameter prediction model. The virtual scene parameter prediction model may be configured to analyze photographing parameters of a target camera device, and output target virtual scene parameters corresponding to virtual content to be photographed by the target camera device.

The following briefly describes a parameter configuration solution provided in the examples of this application. Through the parameter configuration solution, parameter configuration efficiency and accuracy can be improved. FIG. 1 is a diagram of a scene of virtual film production according to an example of this application. As shown in FIG. 1, the scene mainly includes: a camera device 101 and a display device 102. A parameter configuration method provided in the examples of this application may be performed by a server. The camera device 101 is an on-site photographing camera. The camera device 101 may include, but is not limited to: a smart device having a photographing function such as a smartphone (such as an Android phone or an iOS phone), a tablet computer, a camera, or a camcorder. This is not limited in the examples of this application. The display device 102 may be a smart device having image rendering and display functions, such as an LED screen (e.g., an LED curtain wall).

The camera device 101 and the display device 102 in FIG. 1 may be directly or indirectly connected to each other through wired communication or wireless communication. This is not limited in this application. Quantities of camera devices and display devices are merely used as examples and do not constitute an actual limitation on this application. For example, the scene shown in FIG. 1 may further include a camera device 103, a display device 104, or the like. A server may be further included in the scene. The server may determine a virtual scene parameter according to a photographing parameter of the camera device 101, and transmit the virtual scene parameter to the display device 102, so that the display device 102 displays virtual content 106 according to the virtual scene parameter. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. This is not limited in the examples of this application. FIG. 1 further includes a screen front scene 105. The camera device 101 simultaneously captures fused pictures of the screen front scene 105 and the virtual content 106 that is presented on the display device 102.

A general principle of the parameter configuration solution is as follows:

(1) The display device 102 obtains photographing parameters of the camera device 101. In an implementation, the photographing parameters include a focal length, an aperture value, and a focal point value. The focal point value refers to a distance between the camera device 101 and a to-be-photographed subject of the device. The photographing parameters of the camera device 101 are, for example, photographing parameters that are set in real time by a camera person on the camera device 101 and that are configured for photographing a fused picture of the screen front scene 105 (a real scene) and the virtual content 106 that is displayed on the display device 102.

(2) The display device 102 obtains a reference dataset. The reference dataset includes a correspondence between reference photographing parameters and virtual scene parameters. The reference photographing parameters are configured for describing photographing parameters of the reference camera device (that is, a real camera device or a physical camera device used when the reference dataset is configured). The virtual scene parameters are configured for describing photographing parameters of a virtual camera device in a virtual scene. By adjusting the photographing parameters of the virtual camera device, the virtual scene may be adjusted (for example, in terms of a depth of field effect).

In an implementation, the reference camera device includes a plurality of groups of photographing parameters. A manner of determining a correspondence between reference photographing parameters and virtual scene parameters is as follows. The reference camera device is enabled to photograph a reference object according to the first group of reference photographing parameters to obtain a real image. A virtual object corresponding to the reference object is adjusted by adjusting the virtual scene parameters, and the reference camera device is enabled to photograph a virtual object according to the first group of reference photographing parameters to obtain a virtual image. When the real image matches the virtual image (for example, a depth of field effect of the virtual image matches a depth of field effect of the real image), virtual scene parameters are recorded, and a correspondence between the virtual scene parameters and the first group of reference photographing parameters is established. The first group of reference photographing parameters may be any one of a plurality of groups of photographing parameters.

In an example, in a real scene, N reference objects are arranged in ascending order of distances from the reference camera device, where N is an integer greater than 1. The N reference objects are located on the same straight line and are at equal intervals from each other. Images obtained by photographing the N reference objects by the reference camera device according to the first group of reference photographing parameters are referred to as real images. When a real image is collected, a distance between the reference camera device and a closest reference object is the same as the interval between the reference objects, and the reference camera device and the N reference objects are located on the same straight line. The focal point of the reference camera device may be on one of N−x reference objects at distances from the reference camera device less than a distance threshold among the N reference objects.

After the real image is obtained, x reference objects at distances from the reference camera device greater than the distance threshold among the N reference objects are removed, and the x removed reference objects are simulated in the display device in the real scene. For example, x virtual objects are displayed on the display device, the x virtual objects are located on the same straight line as the N−x reference objects that are not removed, and display effects of the x virtual objects may be adjusted through the virtual scene parameters. An image obtained by photographing, by the reference camera device according to the first group of reference photographing parameters (at the same position at which the real image is photographed), the N−x reference objects that remain and the x virtual objects that are simulated in the display device is referred to as a virtual image. A focal point of photographing a virtual image by the reference camera device is the same as the foregoing focal point of photographing the N reference objects. In the virtual scene, a focal length of the virtual camera device is the same as that of the reference camera device. When the real image matches the virtual image (for example, when a size or diameter of the reference object in the real image matches that of the virtual object in the corresponding virtual image), virtual scene parameters are recorded, and a correspondence between the virtual scene parameters and the first group of reference photographing parameters is established.

After the correspondence between the virtual scene parameters and the first group of reference photographing parameters are established, the aperture of the reference camera device may be changed for a plurality of times, and the foregoing process is repeated, to establish a correspondence between a plurality of groups of virtual scene parameters and the reference photographing parameters.

Then, the focal point of the reference camera device may be changed (for example, to be on another one of the N−x reference objects at the distances from the reference camera device less than the distance threshold among the N reference objects), and the foregoing process is repeated. A correspondence between more groups of virtual scene parameters and the reference photographing parameters is established. For the foregoing process, reference may be made to FIG. 4C.

For example, in a real scene, 10 reference objects (for example, 10 balls) are arranged in ascending order of distances from the reference camera device. The 10 reference objects are located on the same straight line and are at equal intervals from each other (for example, the interval is 2 meters). The reference camera device is enabled to photograph the 10 reference objects according to the first group of reference photographing parameters to obtain a real image. When a real image is collected, if the interval between the reference objects is 2 meters, the distance between the reference camera device and the closest reference object is also 2 meters, and the reference camera device and the 10 reference objects are located on the same straight line. After the real image is obtained, reference objects at distances from the reference camera device greater than the distance threshold among the 10 reference objects are removed (for example, 5 reference objects farthest from the reference camera device are removed), and the 5 removed reference objects are simulated in the display device in the real scene. That is to say, 5 virtual objects are displayed on the display device, the 5 virtual objects are located on the same straight line as the 5 reference objects that are not removed, and display effects of the 5 virtual objects may be adjusted through the virtual scene parameters. The reference camera device photographs, according to the first group of reference photographing parameters (at the same position at which the real image is photographed), the 5 reference objects that remain and the 5 virtual objects that are simulated in the display device to obtain as a virtual image. When the real image matches the virtual image (for example, a depth of field effect of the virtual image matches a depth of field effect of the real image, or a size or diameter of the reference object in the real image matches that of the virtual object in the corresponding virtual image), virtual scene parameters are recorded, and a correspondence between the virtual scene parameters and the first group of reference photographing parameters is established.

(3) The display device 102 determines, according to the photographing parameters of the camera device 101 and a reference dataset, target virtual scene parameters corresponding to virtual content to be photographed by the camera device 101. Specifically, the display device 102 determines, according to a relationship between the photographing parameters of the camera device 101 and the photographing parameters of the reference camera device and a correspondence between the photographing parameters of the reference camera device and the photographing parameters of the virtual camera device, the target virtual scene parameters corresponding to the virtual content to be photographed by the camera device 101 (namely, the photographing parameters of the virtual camera device that correspond to the photographing parameters of the camera device 101).

For example, the photographing parameters of the camera device 101 obtained in real time include: a focal point, a focal length, and an aperture value. It is determined whether the real-time aperture value of the camera device 101 is consistent with a recorded aperture value of the reference camera device in the reference dataset, to obtain two results:

1>. If the real-time aperture value of the camera device 101 is consistent with a recorded aperture value of the reference camera device, it is determined whether the focal point value of the camera device 101 is consistent with the recorded focal point value of the reference camera device, to obtain two results similarly:

A. If the focal point values are consistent, the recorded aperture value (focal point value) of the virtual camera device corresponding to the aperture value (focal point value) of the reference camera device in the reference dataset is directly configured for the current virtual camera device.

B. If the focal point values are inconsistent, two operations are performed: First operation: the recorded aperture value of the virtual camera device corresponding to the aperture value of the camera device 101 is directly used as the aperture value of the current virtual camera device. Second operation: the focal point value of the current virtual camera device is calculated and applied as follows: A position (a percentage) at which the focal point value of the camera device 101 is in the middle of La→Lb is calculated, and a product is obtained by multiplying this data by a difference between the recorded focal point values of the virtual camera device respectively corresponding to La and Lb and is added to the recorded focal point value of the virtual camera device corresponding to La to obtain a sum as the focal point value of the current virtual camera device, where La and Lb are recorded focal point values of two adjacent magnitudes of the reference camera device.

2>. If the aperture value of the camera device 101 is inconsistent with a recorded aperture value of the reference camera device, it is determined whether the focal point value of the camera device 101 is consistent with the recorded focal point value of the reference camera device, to obtain two results:

A>. If the focal point values are consistent, two operations are performed: First operation: the recorded focal point value of the virtual camera device corresponding to the focal point value of the camera device 101 is directly used as the focal point value of the current virtual camera device. Second operation: the aperture value of the current virtual camera device is calculated and applied as follows: A position (a percentage) at which the aperture value of the camera device 101 is in the middle of Fa→Fb is calculated, and a product is obtained by multiplying this data by a difference between the recorded aperture values of the virtual camera device respectively corresponding to Fa and Fb and is added to the recorded aperture value of the virtual camera device corresponding to Fa to obtain a sum as the aperture value of the current virtual camera device, where Fa and Fb are recorded aperture values of two adjacent magnitudes of the reference camera device.

B>. If the focal point values are inconsistent, the focal point value and the aperture value of the current virtual camera device are separately calculated and applied:

Focal point value: A position (a percentage) at which the focal point value of the camera device 101 is in the middle of La→Lb is calculated, and a product is obtained by multiplying this data by a difference between the recorded focal points of the reference camera device corresponding to La and Lb and is added to the recorded focal point corresponding to La.

Aperture value: A position (a percentage) at which the aperture value of the camera device 101 is in the middle of Fa→Fb is calculated, and a product is obtained by multiplying this data by a difference between the recorded apertures of the reference camera device corresponding to Fa and Fb and is added to the recorded aperture corresponding to Fa.

The foregoing example is also applicable to operation S304 in FIG. 3 below: Determine, according to a relationship between the photographing parameters of the target camera device and the photographing parameters of the reference camera device and a correspondence between the photographing parameters of the reference camera device and the photographing parameters of the virtual camera device, the target virtual scene parameters corresponding to the virtual content to be photographed by the target camera device. (4) The display device 102 displays the virtual content according to the target virtual scene parameters, to cause the camera device 101 to photograph the virtual content. The display device 102 displays the to-be-photographed virtual content according to the target virtual scene parameters, so that the camera device 101 photographs a fused picture of the screen front scene 105 and the to-be-photographed virtual content displayed on the display device 102.

Based on the foregoing parameter configuration solution, the examples of this application provide a more detailed parameter configuration method. The data transmission method provided in the examples of this application is described in detail below with reference to the accompanying drawings.

Figure 2:
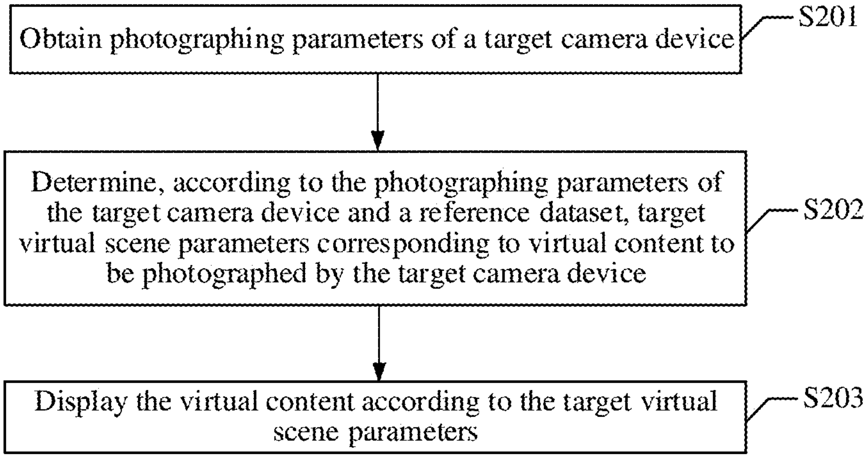
FIG. 2 shows a parameter configuration method according to an example of this application.

FIG. 2 shows a parameter configuration method according to an example of this application. The parameter configuration method may be performed by a computer device (e.g., a computing device). The computer device may be specifically the display device 102 shown in FIG. 1. As shown in FIG. 2, the parameter configuration method may include the following operations S201 to S203:

S201. Obtain photographing parameters of a target camera device.

The photographing parameters of the target camera device are parameters used by the target camera device to photograph an image. In an implementation, the photographing parameters include lens parameters of the target camera device. Specifically, the lens parameters of the target camera device may include a focal length, an aperture value, and a focal point value. The focal point value refers to a distance between the target camera device and a to-be-photographed subject of the device. The photographing parameters of the target camera device are, for example, obtained by the computer device from the target camera device after the photographing parameters of the target camera device are manually or automatically set in real time on the target camera device. The photographing parameters of the target camera device are photographing parameters that are configured for photographing a fused picture of a real scene of a photographing site and virtual content displayed on a display device of the photographing site.

S202. Determine, according to the photographing parameters of the target camera device and a reference dataset, target virtual scene parameters corresponding to virtual content to be photographed by the target camera device.

The computer device may obtain the reference dataset locally or from another device via a network. The reference dataset includes a correspondence between reference photographing parameters and virtual scene parameters. The reference photographing parameters are configured for describing photographing parameters of the reference camera device (for example, a real camera device used when the reference dataset is configured). The reference photographing parameters include lens parameters of the reference camera device. The virtual scene parameters are configured for describing photographing parameters of a virtual camera device in a virtual scene. The photographing parameters of the virtual camera device include lens parameters of the virtual camera device. By adjusting the photographing parameters of the virtual camera device, presentation of the virtual scene may be adjusted, for example, a depth of field effect of the virtual scene is adjusted.

In an implementation, the computer device determines, according to a relationship between the photographing parameters of the target camera device and the photographing parameters of the reference camera device and a correspondence between the photographing parameters of the reference camera device and the photographing parameters of the virtual camera device, the target virtual scene parameters corresponding to the virtual content to be photographed by the camera device 101 (namely, the photographing parameters of the virtual camera device that correspond to the photographing parameters of the target camera device).

In an example, the reference dataset includes M*N*P groups of photographing parameters. Each group of photographing parameters includes a focal length, an aperture value, and a focal point value, M is a quantity of candidate focal lengths, N is a quantity of candidate aperture values, P is a quantity of candidate focal point values, and M, N, and P are all positive integers. The photographing parameters of the target camera device include an actual focal length, an actual aperture value, and an actual focal point value. A specific implementation in which the computer device determines, according to the photographing parameters of the target camera device and a preset reference dataset, target virtual scene parameters corresponding to virtual content to be photographed by the target camera device is: determining the actual focal length as the scene focal length of the target virtual scene, and determining whether there is a candidate focal length that is consistent with the actual focal length in the M candidate focal lengths of the reference camera device; and determining, if the actual focal length is consistent with an $i^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length; or determining, if the actual focal length is between an $i^{th}$ candidate focal length and an $(i+1)^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, where i is a positive integer less than M.

In another implementation, the computer device trains an initial model by using a reference dataset to obtain a virtual scene parameter prediction model. The virtual scene parameter prediction model may be configured to analyze photographing parameters of a target camera device, and output target virtual scene parameters corresponding to virtual content to be photographed by the target camera device. A process in which the computer device trains an initial model by using a reference dataset to obtain a virtual scene parameter prediction model is: analyzing photographing parameters of the reference camera device by using the initial model, to predict photographing parameters of the virtual camera device; and calculating, by using a loss function, a loss value of the photographing parameters of the virtual camera device corresponding to the predicted photographing parameters of the virtual camera device and the photographing parameters of the reference camera device, and adjusting parameters in the initial model based on the loss value, to obtain the virtual scene parameter prediction model.

S203. Display the virtual content according to the target virtual scene parameters.

The computer device displays the virtual content according to the target virtual scene parameters, and the target camera device photographs the virtual content displayed in the computer device to obtain a virtual film production image.

Operation S203 may specifically include: displaying the to-be-photographed virtual content on the display device according to the target virtual scene parameters, to cause the target camera device to photograph a fused picture of the real scene and the to-be-photographed virtual content displayed on the display device.

In the examples of this application, by determining, according to the photographing parameters of the target camera device and a preset reference dataset, target virtual scene parameters corresponding to virtual content to be photographed by the target camera device, and then displaying the to-be-photographed virtual content according to the target virtual scene parameters, the target virtual scene parameters may be changed in real time according to the photographing parameters of the target camera device, to display the to-be-photographed virtual content. Therefore, the target camera device can almost simultaneously photograph a real scene and virtual content that corresponds to the real scene and that is displayed on a display device, which has high real-time performance. In addition, a transition between the real scene and the virtual content that is displayed according to the virtual scene parameters can be made smooth in an image photographed by the target camera device according to the photographing parameters of the target camera device.

Figure 3:
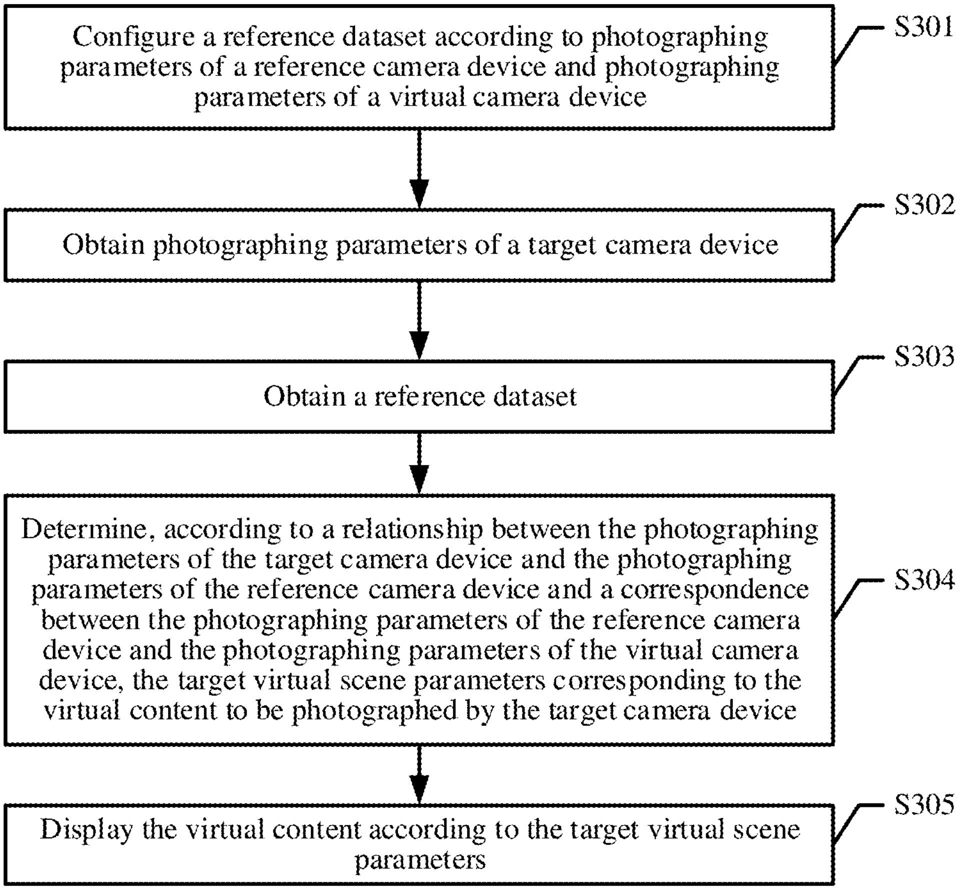
FIG. 3 shows another parameter configuration method according to an example of this application.

FIG. 3 shows another parameter configuration method according to an example of this application. The parameter configuration method may be performed by a computer device. The computer device may be specifically the display device 102 shown in FIG. 1. As shown in FIG. 3, the parameter configuration method may include the following operations S301 to S305:

S301. Configure a reference dataset according to photographing parameters of a reference camera device and photographing parameters of a virtual camera device.

The reference camera device includes a plurality of groups of photographing parameters. A configuration process in which the computer device configures the reference dataset is as follows. The computer device obtains a first group of photographing parameters of the reference camera device, and photographs a real image of a reference object based on the first group of photographing parameters by using the reference camera device. The first group of photographing parameters is any one of the plurality of groups of photographing parameters. In an aspect, the reference object is simulated to obtain a virtual object, and the virtual object is adjusted by adjusting virtual scene parameters. The reference object is simulated, for example, by a game engine. In another aspect, the virtual object is photographed based on the first group of photographing parameters by using the reference camera device, to obtain a virtual image. The virtual image is compared with the real image, and target virtual scene parameters corresponding to a case that the virtual image matches the real image are recorded. A correspondence between the first group of photographing parameters and the target virtual scene parameters is established, and the correspondence is added to the reference dataset.

The photographing a real image of a reference object based on the first group of photographing parameters by using the reference camera device specifically includes the following content. Images of N reference objects in a real scene are photographed by using the reference camera device. The N reference objects are arranged in ascending order of distances from the reference camera device, are located on the same straight line, and are at equal intervals from each other. A distance between the reference camera device and a closest reference object is the same as the interval between the reference objects. The first group of photographing parameters of the reference camera device includes a focal length, an aperture value, and a focal point value. The focal point corresponding to the focal point value is on one of N−x reference objects at distances from the reference camera device less than a distance threshold among the N reference objects, where N is an integer greater than 1, and x<N.

The photographing the virtual object based on the first group of photographing parameters by using the reference camera device, to obtain a virtual image specifically includes the following content. Images of the N−x reference objects at the distances from the reference camera device less than the distance threshold among the N reference objects, and x virtual objects in the virtual scene displayed on a display device at the interval from an $(N-x)^{th}$ reference object are photographed by the reference camera device based on the first group of photographing parameters. The x virtual objects correspond to x reference objects at a distance from the reference camera device greater than the distance threshold among the N reference objects.

The comparing the virtual image with the real image, and recording target virtual scene parameters corresponding to a case that the virtual image matches the real image includes: comparing sizes of the x virtual objects in the virtual image with sizes of the x reference objects in the corresponding real image, adjusting the virtual scene parameters according to a comparison result, to cause the sizes of the x virtual objects in the virtual image to match the sizes of the x reference objects in the corresponding real image, and recording virtual scene parameters adjusted during matching as the target virtual scene parameters.

In an implementation, the reference dataset includes M*N*P groups of photographing parameters. Each group of photographing parameters includes a focal length, an aperture value, and a focal point value, M is a quantity of candidate focal lengths, N is a quantity of candidate aperture values, P is a quantity of candidate focal point values, and M, N, and P are all positive integers. The first group of photographing parameters includes an $i^{th}$ candidate focal length, a $j^{th}$ candidate aperture value, and a $k^{th}$ candidate focal point value, where i is a positive integer less than M, j is a positive integer less than N, and k is a positive integer less than P.

Figure 4A:
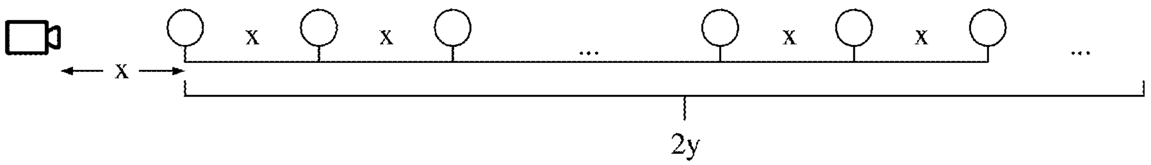
FIG. 4A is a schematic diagram of photographing a real image according to an example of this application.

FIG. 4A is a schematic diagram of photographing a real image according to an example of this application. As shown in FIG. 4A, in a real scene, 2y reference objects (such as small balls) which are a $1^{st}$ reference object, a $2^{nd}$ reference object, . . . , and a $(2y)^{th}$ reference object are placed in ascending order of distances from a reference camera device. The 2y reference objects are on the same straight line, and an interval between each two reference objects is x meters. A distance between the reference camera device and the first reference object is x meters. The reference camera device photographs the reference object by using the $i^{th}$ candidate focal length, the $j^{th}$ candidate aperture value, and the $k^{th}$ candidate focal point value, to obtain an image of the reference object in the real scene, which is referred to as a real image. x is a positive number, and y is an integer greater than or equal to P. In a specific implementation, the focal point of the reference camera device is set at the center of the $1^{st}$ reference object, and the distance between the $1^{st}$ reference object and the reference camera device is determined as the $1^{st}$ candidate focal point value. Similarly, the focal point of the reference camera device is set at the center of the $k^{th}$ reference object, and the distance between the $k^{th}$ reference object and the reference camera device is determined as the $k^{th}$ candidate focal point value. The candidate aperture values may include, but are not limited to: 2.8, 4, 5.6, and 8. The candidate focal lengths may include, but are not limited to, 16 mm, 24 mm, 35 mm, 50 mm, 75 mm, and 105 mm.

Figure 4B:
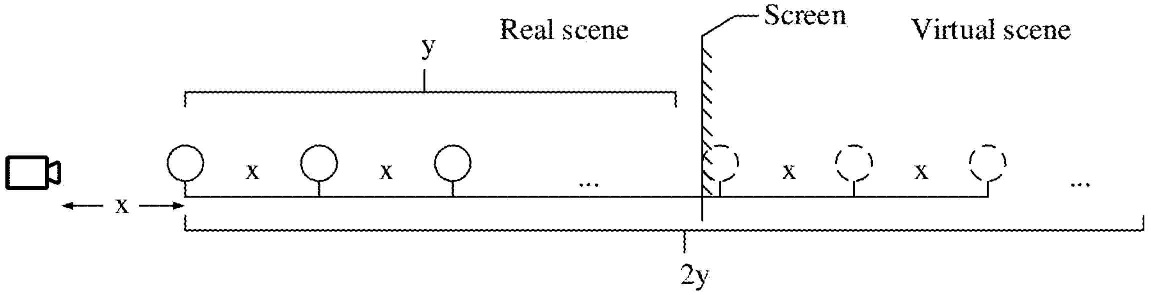
FIG. 4B is a schematic diagram of photographing a virtual image according to an example of this application.
Figure 4C:
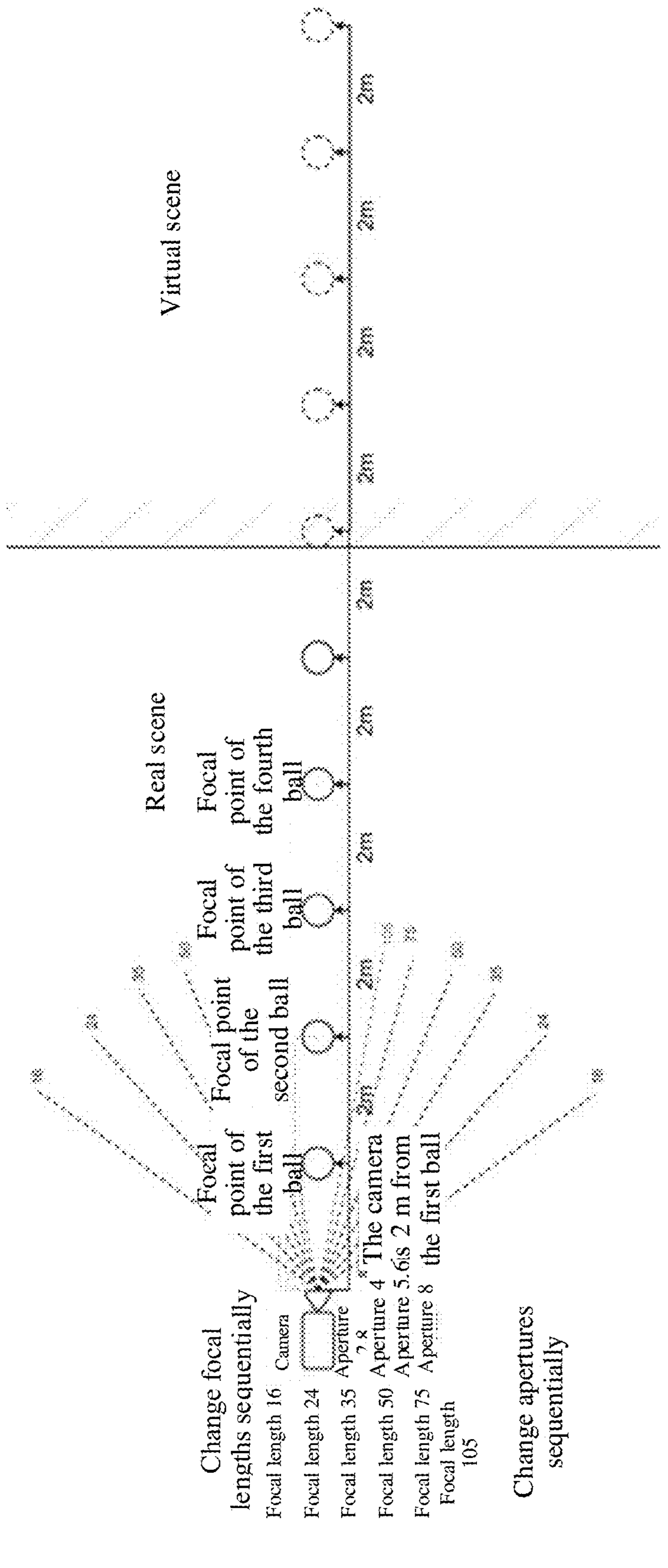
FIG. 4C is a schematic diagram of photographing when a reference dataset is configured according to an example of this application.

FIG. 4B is a schematic diagram of photographing a virtual image according to an example of this application. As shown in FIG. 4B, in a real scene, y reference objects (such as small balls) are placed in ascending order of distances from a reference camera device, and an interval between each two reference objects is x meters. A distance between the reference camera device and the first reference object is x meters. An LED screen is disposed in the real scene. A distance between the screen and the $y^{th}$ reference object is x meters. The screen coincides with the first virtual object displayed on the screen, for example, coincides with the edge of the first virtual object, or coincides, when the first virtual object is a small ball, with a tangent line to the edge of the small ball. The screen displays y virtual objects that are placed in the virtual scene in ascending order of distances from the screen. The y virtual objects and the y reference objects are on the same straight line, and the straight line is perpendicular to the screen. An interval between the virtual objects is x meters. A distance between the reference camera device and the first reference object is x meters. The reference camera device photographs, by using the $i^{th}$ candidate focal length, the $j^{th}$ candidate aperture value, and the $k^{th}$ candidate focal point value, an image in which the reference object and the virtual object are fused, to obtain a virtual image.

In an implementation, a specific manner in which the computer device adjusts the virtual object by adjusting the virtual scene parameters is: determining the $i^{th}$ candidate focal length as a virtual focal length of the virtual camera device, and configuring a virtual aperture value and a virtual focal point value of the virtual camera device. When the real image collected by the reference camera device in the manner in FIG. 4A matches the virtual image collected by the reference camera device in the manner in FIG. 4B (for example, depth of field effects of the two images are consistent, or a size or diameter of the reference object in the real image matches that of the virtual object in the corresponding virtual image (when the reference object and the virtual object are small balls)), the computer device records virtual scene parameters of the virtual camera device, including a virtual focal length, a virtual aperture value, and a virtual focal point value, and establishes a correspondence between the virtual scene parameters and an $i^{th}$ candidate focal length, a $j^{th}$ candidate aperture value, and a $k^{th}$ candidate focal point value (a group of photographing parameters). The foregoing method is repeated to obtain virtual scene parameters corresponding to the M*N*P groups of photographing parameters. For the foregoing process, reference may be made to FIG. 4C. The reference camera device first photographs a real image and a virtual image by using a focal length of 16 mm and sequentially adjusting an aperture to 2.8, 4, 5.6, and 8, and performs matching between the real image and the virtual image to obtain virtual scene parameters. Next, the foregoing process is repeated by the reference camera device using focal lengths of 24 mm, 35 mm, 50 mm, 75 mm, and 105 mm.

Table 1 is a schematic table for recording virtual scene parameters corresponding to various groups of photographing parameters according to an example of this application.

TABLE 1

| Candidate focal length | Candidate aperture value | Candidate focal point value | Virtual scene parameter |
|---|---|---|---|
| $A_1$ | $B_1$ | $C_1$ | $A_1$, $D_1$, and $E_1$ |
| | | $C_P$ | $A_1$, $D_P$, and $E_P$ |
| | . . . | . . . | . . . |
| | $B_N$ | $C_1$ | $A_1$, $F_1$, and $G_1$ |
| . . . | . . . | . . . | . . . |
| | | $C_P$ | $A_1$, $F_P$, and $G_P$ |
| | | . . . | |
| $A_M$ | $B_1$ | $C_1$ | $A_M$, $H_1$, and $J_1$ |
| | | . . . | . . . |
| | | $C_P$ | $A_M$, $H_P$, and $J_P$ |
| | . . . | . . . | . . . |
| | $B_N$ | $C_1$ | $A_M$, $L_1$, and $Q_1$ |
| | | . . . | . . . |
| | | $C_P$ | $A_M$, $L_P$, and $Q_P$ |

As shown in Table 1, when the candidate focal length is $A_1$, the candidate aperture value is $B_1$, and the candidate focal point value is $C_1$, the virtual scene parameters are: $A_1$, $D_1$, and $E_1$, where $A_1$ is a virtual focal length, $D_1$ is a virtual aperture value, and $E_1$ is a virtual focal point value. One candidate focal length, one candidate aperture value, and one candidate focal point value form a group of photographing parameters of the reference camera device. Each group of photographing parameters of the reference camera device have an index function. That is to say, each group of photographing parameters of the reference camera device correspond to unique virtual scene parameters. For example, virtual scene parameters corresponding to $A_1$, $B_1$, and $C_1$ are $A_1$, $D_1$, and $E_1$.

In Table 1, the order of a candidate focal length, a candidate aperture value, and a candidate focal point value may be changed. For example, the order of a candidate aperture value and a candidate focal point value is changed. The order in Table 1 represents virtual scene parameters corresponding to different candidate focal point values under each candidate aperture value, and the changed order of a candidate aperture value and a candidate focal point value represents virtual scene parameters corresponding to different candidate aperture values under each candidate focal point value. Since the candidate focal length is consistent with the virtual focal length, the virtual focal length may no longer be recorded in the virtual scene parameters.

S302. Obtain photographing parameters of a target camera device.

S303. Obtain a reference dataset.

For specific implementations of operation S302 and operation S303, reference may be made to the implementation of operation S202 in FIG. 2. Details are not described herein again.

S304. Determine, according to a relationship between the photographing parameters of the target camera device and the photographing parameters of the reference camera device and a correspondence between the photographing parameters of the reference camera device and the photographing parameters of the virtual camera device, the target virtual scene parameters corresponding to the virtual content to be photographed by the target camera device.

The computer device determines the actual focal length as a scene focal length of a target virtual scene corresponding to the virtual content to be photographed by the target camera device. For example, assuming that an actual focal length of the target camera device is 16 mm, the computer device configures a scene focal length of a target virtual scene corresponding to virtual content to be photographed by the target camera device to be 16 mm.

S11: The computer device determines whether there is a candidate focal length that is the same as the actual focal length of the target camera device in the M candidate focal lengths of the reference camera device.

The computer device determines, if the actual focal length of the target camera device is consistent with an $i^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length, where i is a positive integer less than M. For details, refer to operation S12.

The computer device determines, if the actual focal length of the target camera device is between an $i^{th}$ candidate focal length and an $(i+1)^{th}$ candidate focal length of the reference camera device (for example, the $i^{th}$ candidate focal length < the actual focal length < the $(i+1)^{th}$ candidate focal length), a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, where i is a positive integer less than M. For details, refer to operation S15.

S12: When the actual focal length of the target camera device is consistent with the $i^{th}$ candidate focal length of the reference camera device, the computer device determines whether there is a candidate aperture value that is the same as the actual aperture value of the target camera device in the N candidate aperture values of the reference camera device.

The computer device determines, if the actual aperture value of the target camera device is consistent with a $j^{th}$ candidate aperture value associated with an $i^{th}$ candidate focal length of the reference camera device, a scene aperture value and a scene focal point value of the target virtual scene according to a relationship between the actual focal point value of the target camera device and the candidate focal point value associated with the $j^{th}$ candidate aperture value associated with the $i^{th}$ candidate focal length of the reference camera device, where j is a positive integer less than N. For details, refer to operation S13.

The computer device determines, if the actual aperture value of the target camera device is between the $j^{th}$ candidate aperture value associated with the $i^{th}$ candidate focal length of the reference camera device and the $(j+1)^{th}$ candidate aperture value associated with the $i^{th}$ candidate focal length of the reference camera device (for example, the $j^{th}$ candidate aperture value < the actual aperture value < the $(j+1)^{th}$ candidate aperture value), a scene aperture value and a scene focal point value of the target virtual scene according to a relationship between the actual focal point value of the target camera device and the candidate focal point value associated with the $j^{th}$ candidate aperture value associated with the $i^{th}$ candidate focal length of the reference camera device and a relationship between the actual focal point value of the target camera device and the candidate focal point value associated with the $(j+1)^{th}$ candidate aperture value associated with the $i^{th}$ candidate focal length of the reference camera device, where j is a positive integer less than N. For details, refer to operation S14.

S13: When the actual focal length of the target camera device is consistent with the $i^{th}$ candidate focal length of the reference camera device, and the actual aperture value of the target camera device is consistent with the $j^{th}$ candidate aperture value of the reference camera device, the computer device determines whether there is a candidate focal point value that is the same as the actual focal point value of the target camera device in the P candidate focal point values of the reference camera device.

If the actual focal point value of the target camera device is consistent with a $k^{th}$ candidate focal point value associated with a $j^{th}$ candidate aperture value associated with an $i^{th}$ candidate focal length of the reference camera device, where k is a positive integer less than P, the computer device determines a virtual aperture value and a virtual focal point value that correspond to the $k^{th}$ candidate focal point value associated with the $j^{th}$ candidate aperture value associated with the $i^{th}$ candidate focal length as a scene aperture value and a scene focal point value of the target virtual scene respectively. Specifically, referring to the foregoing Table 1, for the reference camera device, an $i^{th}$ candidate focal length is $A_i$, a $j^{th}$ candidate aperture value is $B_j$, and a $k^{th}$ candidate focal point value is $C_k$. Then, the computer device determines, based on $A_i$, $B_j$, and $C_k$, a scene aperture value and a scene focal point value of a virtual scene corresponding thereto from Table 1, and determines the scene aperture value and the scene focal point value of the virtual scene and the actual focal length of the target camera device as target virtual scene parameters.

If the actual focal point value of the target camera device is between the $k^{th}$ candidate focal point value associated with the $j^{th}$ candidate aperture value associated with the $i^{th}$ candidate focal length of the reference camera device and the $(k+1)^{th}$ candidate focal point value associated with the $j^{th}$ candidate aperture value associated with the $i^{th}$ candidate focal length of the reference camera device (for example, the $k^{th}$ candidate focal point value < the actual focal point value < the $(k+1)^{th}$ candidate focal point value), the computer device calculates a scene aperture value and a scene focal point value of the target virtual scene according to the virtual aperture value and the virtual focal point value corresponding to the $k^{th}$ candidate focal point value associated with the $j^{th}$ candidate aperture value associated with the $i^{th}$ candidate focal length of the reference camera device, and a virtual aperture value and a virtual focal point value corresponding to the $(k+1)^{th}$ candidate focal point value associated with the $j^{th}$ candidate aperture value associated with the $i^{th}$ candidate focal length of the reference camera device. Specifically, referring to the foregoing Table 1, for the reference camera device, an $i^{th}$ candidate focal length is $A_i$, a $j^{th}$ candidate aperture value is $B_j$, a $k^{th}$ candidate focal point value is $C_k$, and a $(k+1)^{th}$ candidate focal point value is $C_{k+1}$ (assuming that $C_{k+1}>C_k$). In a specific implementation, assuming that an actual focal point value of the target camera device is $R_1$, the computer device determines, based on $A_i$, $B_j$, and $C_k$, a scene aperture value $T_k$ and a scene focal point value $W_k$ of a virtual scene corresponding thereto from Table 1; and determines, based on $A_i$, $B_j$, and $C_{k+1}$, a scene aperture value $T_{k+1}$ and a scene focal point value $W_{k+1}$ of a virtual scene corresponding thereto from Table 1 (assuming that $W_{k+1}>W_k$). Then, the target virtual scene parameters are as follows:

$$\text{Target scene aperture value} = (T_k + T_{k+1})/2$$

$$\text{Target scene focal point value} = \left[(R_1 - C_k)/(C_{k+1} - C_k)\right] * (W_{k+1} - W_k) + W_k$$

In addition, the target scene focal length is an actual focal length of the target camera device.

S14: When the actual focal length of the target camera device is consistent with the $i^{th}$ candidate focal length of the reference camera device, and the actual aperture value of the target camera device is between the $j^{th}$ candidate aperture value and the $(j+1)^{th}$ candidate aperture value of the reference camera device, the computer device determines whether there is a candidate focal point value that is the same as the actual focal point value of the target camera device in the P candidate focal point values of the reference camera device.

If the actual focal point value of the target camera device is consistent with a $k^{th}$ candidate focal point value associated with a $j^{th}$ candidate aperture value associated with an $i^{th}$ candidate focal length of the reference camera device, a scene aperture value and a scene focal point value of the target virtual scene are calculated according to a virtual aperture value and a virtual focal point value that correspond to the $k^{th}$ candidate focal point value associated with the $j^{th}$ candidate aperture value associated with the $i^{th}$ candidate focal length of the reference camera device, and a virtual aperture value and a virtual focal point value that correspond to a $k^{th}$ candidate focal point value associated with the $(j+1)^{th}$ candidate aperture value associated with the $i^{th}$ candidate focal length of the reference camera device. Specifically, referring to the foregoing Table 1, for the reference camera device, an $i^{th}$ candidate focal length is $A_i$, a $j^{th}$ candidate aperture value is $B_j$, a $(j+1)^{th}$ candidate aperture value is $B_{j+1}$, and a $k^{th}$ candidate focal point value is $C_k$. In a specific implementation, assuming that an actual aperture value of the target camera device is $Q_1$, the computer device determines, based on $A_i$, $B_j$, and $C_k$, a scene aperture value $T_k$ and a scene focal point value $W_k$ of a virtual scene corresponding thereto from Table 1; and determines, based on $A_i$, $B_{j+1}$ (assuming that $B_{j+1}>B_j$), and $C_k$, a scene aperture value $U_k$ (assuming that $U_k>T_k$) and a scene focal point value $V_k$ of a virtual scene corresponding thereto from Table 1. Then, the target virtual scene parameters are as follows:

$$\text{Target scene aperture value} = [(Q_1-B_j)/(B_{j+1}-B_j)]*(U_k-T_k)+T_k$$

$$\text{Target scene focal point value} = (W_k+V_k)/2$$

In addition, the target scene focal length is an actual focal length of the target camera device.

If the actual focal point value of the target camera device is between the $k^{th}$ candidate focal point value associated with the $j^{th}$ candidate aperture value associated with the $i^{th}$ candidate focal length of the reference camera device and the $(k+1)^{th}$ candidate focal point value associated with the $j^{th}$ candidate aperture value associated with the $i^{th}$ candidate focal length of the reference camera device, a scene aperture value and a scene focal point value of the target virtual scene are calculated according to the virtual aperture value and the virtual focal point value corresponding to the $k^{th}$ candidate focal point value associated with the $j^{th}$ candidate aperture value associated with the $i^{th}$ candidate focal length of the reference camera device, a virtual aperture value and a virtual focal point value corresponding to the $(k+1)^{th}$ candidate focal point value associated with the $j^{th}$ candidate aperture value associated with the $i^{th}$ candidate focal length of the reference camera device, a virtual aperture value and a virtual focal point value that correspond to a $k^{th}$ candidate focal point value associated with the $(j+1)^{th}$ candidate aperture value associated with the $i^{th}$ candidate focal length of the reference camera device, and a virtual aperture value and a virtual focal point value that correspond to a $(k+1)^{th}$ candidate focal point value associated with the $(j+1)^1$ candidate aperture value associated with the $i^{th}$ candidate focal length of the reference camera device. Specifically, referring to the foregoing Table 1, for the reference camera device, an $i^{th}$ candidate focal length is $A_i$, a $j^{th}$ candidate aperture value is $B_j$, a $(j+1)^{th}$ candidate aperture value is $B_{j+1}$, a $k^{th}$ candidate focal point value is $C_k$, and a $(k+1)^{th}$ candidate focal point value is $C_{k+1}$.

In a specific implementation, it is assumed that for the target camera device, an actual focal point value is $R_2$ and an actual aperture value is $Q_2$. The computer device determines, based on $A_i$, $B_j$, and $C_k$, a scene aperture value $T_k$ and a scene focal point value $W_k$ of a virtual scene corresponding thereto from Table 1; determines, based on $A_i$, $B_j$, and $C_{k+1}$ (assuming that $C_{k+1}>C_k$), a scene aperture value $T_{k+1}$ and a scene focal point value $W_{k+1}$ of a virtual scene corresponding thereto from Table 1 (assuming that $W_{k+1}>W_k$); determines, based on $A_i$, $B_{j+1}$ (assuming that $B_{j+1}>B_j$), and $C_k$, a scene aperture value $U_k$ and a scene focal point value $V_k$ of a virtual scene corresponding thereto from Table 1; and determines, based on $A_i$, $B_j+1$, and $C_{k+1}$, a scene aperture value $U_{k+1}$ and a scene focal point value $V_{k+1}$ of a virtual scene corresponding thereto from Table 1 (assuming that $V_{k+1}>V_k$). A specific correspondence is shown in Table 2.

TABLE 2

| Reference photographing parameter | Virtual scene parameter |
|---|---|
| $A_i$, $B_j$, and $C_k$ | $T_k$ and $W_k$ |
| $A_i$, $B_j$, and $C_{k+1}$ | $T_{k+1}$ and $W_{k+1}$ |
| $A_i$, $B_{j+1}$, and $C_k$ | $U_k$ and $V_k$ |
| $A_i$, $B_{j+1}$, and $C_{k+1}$ | $U_{k+1}$ and $V_{k+1}$ |

Based on the foregoing Table 2, the target virtual scene parameters are as follows:

$$\text{Target scene aperture value} = [(Q_2-B_j)/(B_{j+1}-B_j)]^*(Z_2-Z_1)+Z_1$$

where $Z_1$ is the smaller one of $(U_k+U_{k+1})/2$ and $(T_k+T_{k+1})/2$, and $Z_2$ is the larger one of $(U_k+U_{k+1})/2$ and $(T_k+T_{k+1})/2$.

$$\text{Target scene focal point value} = (Z_3+Z_4)/2$$

where $Z_3=[(R_2-C_k)/(C_{k+1}-C_k)]*(W_{k+1}-W_k)+W_k$, and $Z_4=[(R_2-C_k)/(C_{k+1}-C_k)]*(V_{k+1}-V_k)+V_k$. In addition, the target scene focal length is an actual focal length of the target camera device.

S15: When the actual focal length of the target camera device is between an $i^{th}$ candidate focal length and an $(i+1)^{th}$ candidate focal length of the reference camera device, the computer device determines whether there is a candidate aperture value that is the same as the actual aperture value of the target camera device in the N candidate aperture values of the reference camera device.

The computer device determines, if the actual aperture value of the target camera device is consistent with a $j^{th}$ candidate aperture value associated with an $i^{th}$ candidate focal length of the reference camera device, a scene aperture value and a scene focal point value of the target virtual scene according to a relationship between the actual focal point value of the target camera device and the candidate focal point value associated with the $j^{th}$ candidate aperture value associated with the $i^{th}$ candidate focal length of the reference camera device, and a relationship between the actual focal point value of the target camera device and the candidate focal point value associated with the $j^{th}$ candidate aperture value associated with the $(i+1)^{th}$ candidate focal length of the reference camera device, where j is a positive integer less than N. For details, refer to operation S16.

The computer device determines, if the actual aperture value of the target camera device is between the $j^{th}$ candidate aperture value associated with the $i^{th}$ candidate focal length of the reference camera device and the $(j+1)^{th}$ candidate aperture value associated with the $i^{th}$ candidate focal length, a scene aperture value and a scene focal point value of the target virtual scene according to a relationship between the actual focal point value of the target camera device and the candidate focal point value associated with the $j^{th}$ candidate aperture value associated with the $i^{th}$ candidate focal length of the reference camera device, a relationship between the actual focal point value of the target camera device and the candidate focal point value associated with the $(j+1)^{th}$ candidate aperture value associated with the $i^{th}$ candidate focal length of the reference camera device, a relationship between the actual focal point value of the target camera device and the candidate focal point value associated with the $j^{th}$ candidate aperture value associated with the $(i+1)^{th}$ candidate focal length of the reference camera device, and a relationship between the actual focal point value of the target camera device and the candidate focal point value associated with the $(j+1)^{th}$ candidate aperture value associated with the $(i+1)^{th}$ candidate focal length of the reference camera device, where j is a positive integer less than N. For details, refer to operation S17.

S16: When the actual focal length of the target camera device is between an $i^{th}$ candidate focal length and an $(i+1)^{th}$ candidate focal length of the reference camera device, and the actual aperture value of the target camera device is consistent with the $j^{th}$ candidate aperture value of the reference camera device, the computer device determines whether there is a candidate focal point value that is the same as the actual focal point value of the target camera device in the P candidate focal point values of the reference camera device.

The computer device calculates, if the actual focal point value of the target camera device is consistent with a $k^{th}$ candidate focal point value associated with the $j^{th}$ candidate aperture value associated with the $i^{th}$ candidate focal length of the reference camera device, a scene aperture value and a scene focal point value of the target virtual scene according to a virtual aperture value and a virtual focal point value that correspond to the $k^{th}$ candidate focal point value associated with the $j^{th}$ candidate aperture value associated with the $i^{th}$ candidate focal length, and a virtual aperture value and a virtual focal point value that correspond to a $k^{th}$ candidate focal point value associated with the $j^{th}$ candidate aperture value associated with the $(i+1)^{th}$ candidate focal length. Specifically, referring to the foregoing Table 1, for the reference camera device, an $i^{th}$ candidate focal length is $A_i$, an $(i+1)^{th}$ candidate focal length is $A_{i+1}$, a $j^{th}$ candidate aperture value is $B_j$, and a $k^{th}$ candidate focal point value is $C_k$. In a specific implementation, assuming that an actual focal length of the target camera device is $FS_1$, the computer device determines, based on $A_i$, $B_j$, and $C_k$, a scene aperture value $T_k$ and a scene focal point value $W_k$ of a virtual scene corresponding thereto from Table 1; and determines, based on $A_{i+1}$, $B_j$, and $C_k$, a scene aperture value $HA_k$ and a scene focal point value $HB_k$ of a virtual scene corresponding thereto from Table 1. Then, the target virtual scene parameters are as follows:

$$\text{Target scene aperture value} = (T_k + HA_k)/2$$

$$\text{Target scene focal point value} = (W_k + HB_k)/2$$

In addition, the target scene focal length is an actual focal length (that is, $FS_1$) of the target camera device.

If the actual focal point value of the target camera device is between the $k^{th}$ candidate focal point value associated with the $j^{th}$ candidate aperture value associated with the $i^{th}$ candidate focal length of the reference camera device and the $(k+1)^{th}$ candidate focal point value associated with the $j^{th}$ candidate aperture value associated with the $i^{th}$ candidate focal length, the computer device calculates a scene aperture value and a scene focal point value of the target virtual scene according to the virtual aperture value and the virtual focal point value corresponding to the $k^{th}$ candidate focal point value associated with the $j^{th}$ candidate aperture value associated with the $i^{th}$ candidate focal length, a virtual aperture value and a virtual focal point value corresponding to the $(k+1)^{th}$ candidate focal point value associated with the $j^{th}$ candidate aperture value associated with the $i^{th}$ candidate focal length, a virtual aperture value and a virtual focal point value that correspond to a $k^{th}$ candidate focal point value associated with the $j^{th}$ candidate aperture value associated with the $(i+1)^{th}$ candidate focal length, and a virtual aperture value and a virtual focal point value that correspond to a $(k+1)^{th}$ candidate focal point value associated with the $j^{th}$ candidate aperture value associated with the $(i+1)^{th}$ candidate focal length. Specifically, referring to the foregoing Table 1, for the reference camera device, an $i^{th}$ candidate focal length is $A_i$, an $(i+1)^{th}$ candidate focal length is $A_{i+1}$, a $j^{th}$ candidate aperture value is $B_j$, a $k^{th}$ candidate focal point value is $C_k$, and a $(k+1)^{th}$ candidate focal point value is $C_{k+1}$.

In a specific implementation, assuming that for the target camera device, an actual focal length is $FS_2$ and an actual focal point value is $R_3$, the computer device determines, based on $A_i$, $B_j$, and $C_k$, a scene aperture value $T_k$ and a scene focal point value $W_k$ of a virtual scene corresponding thereto from Table 1; determines, based on $A_i$, $B_j$, and $C_{k+1}$ (assuming that $C_{k+1}>C_k$), a scene aperture value $T_{k+1}$ and a scene focal point value $W_{k+1}$ of a virtual scene corresponding thereto from Table 1 (assuming that $W_{k+1}>W_k$); determines, based on $A_{i+1}$, $B_j$, and $C_k$, a scene aperture value $HA_k$ and a scene focal point value $HB_k$ of a virtual scene corresponding thereto from Table 1. determines, based on $A_{i+1}$, $B_j$, and $C_{k+1}$, a scene aperture value $HA_{k+1}$ and a scene focal point value $HB_{k+1}$ of a virtual scene corresponding thereto from Table 1 (assuming that $HB_{k+1}>HB_k$). A specific correspondence is shown in Table 3.

TABLE 3

| Reference photographing parameter | Virtual scene parameter |
|---|---|
| $A_i$, $B_j$, and $C_k$ | $T_k$ and $W_k$ |
| $A_i$, $B_j$, and $C_{k+1}$ | $T_{k+1}$ and $W_{k+1}$ |
| $A_{i+1}$, $B_j$, and $C_k$ | $HA_k$ and $HB_k$ |
| $A_{i+1}$, $B_j$, and $C_{k+1}$ | $HA_{k+1}$ and $HB_{k+1}$ |

Based on the foregoing Table 3, the target virtual scene parameters are as follows:

$$\text{Target scene aperture value} = (Z_5 + Z_6)/2$$

where $Z_5=(T_k+T_{k+1})/2$, and $Z_6=(HA_k+HA_{k+1})/2$.

$$\text{Target scene focal point value} = (Z_7 + Z_8)/2$$

where $Z_7=[(R_3-C_k)/(C_{k+1}-C_k)]*(W_{k+1}-W_k)+W_k$, and $Z_8=[(R_3-C_k)/(C_{k+1}-C_k)]*(HB_{k+1}-HB_k)+HB_k$. In addition, the target scene focal length is an actual focal length (that is, $FS_2$) of the target camera device.

S17: When the actual focal length of the target camera device is between an $i^{th}$ candidate focal length and an $(i+1)^{th}$ candidate focal length of the reference camera device, and the actual aperture value of the target camera device is between the $j^{th}$ candidate aperture value associated with the $i^{th}$ candidate focal length of the reference camera device and the $(j+1)^{th}$ candidate aperture value associated with the $i^{th}$ candidate focal length, the computer device determines whether there is a candidate focal point value that is the same as the actual focal point value of the target camera device in the P candidate focal point values of the reference camera device.

If the actual focal point value of the target camera device is consistent with a $k^{th}$ candidate focal point value associated with the $j^{th}$ candidate aperture value associated with the $i^{th}$ candidate focal length of the reference camera device, the computer device calculates a scene aperture value and a scene focal point value of the target virtual scene according to the virtual aperture value and the virtual focal point value corresponding to the $k^{th}$ candidate focal point value associated with the $j^{th}$ candidate aperture value associated with the $i^{th}$ candidate focal length, a virtual aperture value and a virtual focal point value corresponding to the $k^{th}$ candidate focal point value associated with the $(j+1)^{th}$ candidate aperture value associated with the $i^{th}$ candidate focal length, a virtual aperture value and a virtual focal point value that correspond to a $k^{th}$ candidate focal point value associated with the $j^{th}$ candidate aperture value associated with the $(i+1)^{th}$ candidate focal length, and a virtual aperture value and a virtual focal point value that correspond to a $k^{th}$ candidate focal point value associated with the $(j+1)^{th}$ candidate aperture value associated with the $(i+1)^{th}$ candidate focal length. Specifically, referring to the foregoing Table 1, for the reference camera device, an $i^{th}$ candidate focal length is $A_i$, an $(i+1)^{th}$ candidate focal length is $A_{i+1}$, a $j^{th}$ candidate aperture value is $B_j$, a $(j+1)^{th}$ candidate aperture value is $B_{j+1}$, and a $k^{th}$ candidate focal point value is $C_k$.

In a specific implementation, assuming that for the target camera device, an actual focal length is $FS_3$ and an actual aperture value is $Q_3$, the computer device determines, based on $A_i$, $B_j$, and $C_k$, a scene aperture value $T_k$ and a scene focal point value $W_k$ of a virtual scene corresponding thereto from Table 1; determines, based on $A_i$, $B_{j+1}$ (assuming that $B_{j+1}>B_j$), and $C_k$, a scene aperture value $U_k$ (assuming that $U_k>W_k$) and a scene focal point value $V_k$ of a virtual scene corresponding thereto from Table 1; determines, based on $A_{i+1}$, $B_j$, and $C_k$, a scene aperture value $HA_k$ and a scene focal point value $HB_k$ of a virtual scene corresponding thereto from Table 1. determines, based on $A_{i+1}$, $B_{j+1}$, and $C_k$, a scene aperture value $GA_k$ (assuming that $GA_k>HA_k$) and a scene focal point value $GB_k$ of a virtual scene corresponding thereto from Table 1. A specific correspondence is shown in Table 4.

TABLE 4

| Reference photographing parameter | Virtual scene parameter |
|---|---|
| $A_i$, $B_j$, and $C_k$ | $T_k$ and $W_k$ |
| $A_i$, $B_{j+1}$, and $C_k$ | $U_k$ and $V_k$ |
| $A_{i+1}$, $B_j$, and $C_k$ | $HA_k$ and $HB_k$ |
| $A_{i+1}$, $B_{j+1}$, and $C_k$ | $GA_k$ and $GB_k$ |

Based on the foregoing Table 4, the target virtual scene parameters are as follows:

$$\text{Target scene aperture value} = (Z_9 + Z_{10})/2$$

where $Z_9=[(Q_3-B_j)/(B_{j+1}-B_j)]*(U_k-T_k)+T_k$, and $Z_{10}=[(Q_3-B_j)/(B_{j+1}-B_j)]*(GA_k-HA_k)+HA_k$.

$$\text{Target scene focal point value} = (Z_{11} + Z_{12})/2$$

where $Z_{11}=(W_k+V_k)/2$, and $Z_{12}=(HB_k+GB_k)/2$. In addition, the target scene focal length is an actual focal length (that is, $FS_3$) of the target camera device.

If the actual focal point value of the target camera device is between the $k^{th}$ candidate focal point value and the $(k+1)^{th}$ candidate focal point value that are associated with the $j^{th}$ candidate aperture value associated with the $i^{th}$ candidate focal length of the reference camera device, the computer device calculates a scene aperture value and a scene focal point value of the target virtual scene according to the virtual aperture value and the virtual focal point value corresponding to the virtual aperture value and the virtual focal point value corresponding to the $k^{th}$ candidate focal point value associated with the $j^{th}$ candidate aperture value associated with the $i^{th}$ candidate focal length, a virtual aperture value and a virtual focal point value corresponding to the $(k+1)^{th}$ candidate focal point value associated with the $j^{th}$ candidate aperture value associated with the $i^{th}$ candidate focal length, a virtual aperture value and a virtual focal point value corresponding to the $k^{th}$ candidate focal point value associated with the $(j+1)^{th}$ candidate aperture value associated with the $i^{th}$ candidate focal length, a virtual aperture value and a virtual focal point value corresponding to the $(k+1)^{th}$ candidate focal point value associated with the $(j+1)^{th}$ candidate aperture value associated with the $i^{th}$ candidate focal length, a virtual aperture value and a virtual focal point value that correspond to a $k^{th}$ candidate focal point value associated with the $j^{th}$ candidate aperture value associated with the $(i+1)^{th}$ candidate focal length, a virtual aperture value and a virtual focal point value that correspond to a $(k+1)^{th}$ candidate focal point value associated with the $j^{th}$ candidate aperture value associated with the $(i+1)^{th}$ candidate focal length, a virtual aperture value and a virtual focal point value that correspond to a $k^{th}$ candidate focal point value associated with the $(j+1)^{th}$ candidate aperture value associated with the $(i+1)^{th}$ candidate focal length, and a virtual aperture value and a virtual focal point value that correspond to a $(k+1)^{th}$ candidate focal point value associated with the $(j+1)^{th}$ candidate aperture value associated with the $(i+1)^{th}$ candidate focal length. Specifically, referring to the foregoing Table 1, for the reference camera device, an $i^{th}$ candidate focal length is $A_i$, an $(i+1)^{th}$ candidate focal length is $A_{i+1}$, a $j^{th}$ candidate aperture value is $B_j$, a $(j+1)^{th}$ candidate aperture value is $B_{j+1}$, a $k^{th}$ candidate focal point value is $C_k$, and a $(k+1)^{th}$ candidate focal point value is $C_k+1$.

In a specific implementation, it is assumed that for the target camera device, an actual focal length is $FS_4$ an actual aperture value is $Q_4$, and an actual focal point value is $R_4$. The computer device determines, based on $A_i$, $B_j$, and $C_k$, a scene aperture value $T_k$ and a scene focal point value $W_k$ of a virtual scene corresponding thereto from Table 1; determines, based on $A_i$, $B_j$, and $C_{k+1}$ (assuming that $C_{k+1}>C_k$), a scene aperture value $T_{k+1}$ and a scene focal point value $W_{k+1}$ of a virtual scene corresponding thereto from Table 1 (assuming that $W_{k+1}>W_k$); determines, based on $A_i$, $B_{j+1}$ (assuming that $B_{j+1}>B_j$), and $C_k$, a scene aperture value $U_k$ and a scene focal point value $V_k$ of a virtual scene corresponding thereto from Table 1; and determines, based on $A_i$, $B_{j+1}$, and $C_{k+1}$, a scene aperture value $U_{k+1}$ and a scene focal point value $V_{k+1}$ of a virtual scene corresponding thereto from Table 1 (assuming that $V_{k+1}>V_k$); determines, based on $A_{i+1}$, $B_j$, and $C_k$, a scene aperture value $HA_k$ and a scene focal point value $HB_k$ of a virtual scene corresponding thereto from Table 1. determines, based on $A_{i+1}$, $B_j$, and $C_{k+1}$, a scene aperture value $HA_{k+1}$ and a scene focal point value $HB_{k+1}$ of a virtual scene corresponding thereto from Table 1 (assuming that $HB_{k+1}>HB_k$); determines, based on $A_{i+1}$, $B_{j+1}$, and $C_k$, a scene aperture value $GA_k$ and a scene focal point value $GB_k$ of a virtual scene corresponding thereto from Table 1; and determines, based on $A_{i+1}$, $B_{j+1}$, and $C_{k+1}$, a scene aperture value $GA_{k+1}$ and a scene focal point value $GB_k+1$ of a virtual scene corresponding thereto from Table 1 (assuming that $GB_{k+1}>GB_k$). A specific correspondence is shown in Table 5.

TABLE 5

| Reference photographing parameter | Virtual scene parameter |
|---|---|
| $A_i$, $B_j$, and $C_k$ | $T_k$ and $W_k$ |
| $A_i$, $B_j$, and $C_{k+1}$ | $T_{k+1}$ and $W_{k+1}$ |
| $A_i$, $B_{j+1}$, and $C_k$ | $U_k$ and $V_k$ |
| $A_i$, $B_{j+1}$, and $C_{k+1}$ | $U_{k+1}$ and $V_{k+1}$ |
| $A_{i+1}$, $B_j$, and $C_k$ | $HA_k$ and $HB_k$ |
| $A_{i+1}$, $B_j$, and $C_{k+1}$ | $HA_{k+1}$ and $HB_{k+1}$ |
| $A_{i+1}$, $B_{j+1}$, and $C_k$ | $GA_k$ and $GB_k$ |
| $A_{i+1}$, $B_{j+1}$, and $C_{k+1}$ | $GA_{k+1}$ and $GB_{k+1}$ |

Based on the foregoing Table 5, the target virtual scene parameters are as follows:

$$\text{Target scene aperture value} = (Z_{13} + Z_{14})/2$$

where $Z_{13}=[(Q_4-B_j)/(B_j+1-B_j)]*(Z_2-Z_1)+Z_1$; $Z_1$ is the smaller one of $(U_k+U_{k+1})/2$ and $(T_k+T_{k+1})/2$, and $Z_2$ is the larger one of $(U_k+U_{k+1})/2$ and $(T_k+T_{k+1})/2$; $Z_{14}=[(Q_4-B_j)/(B_j+1-B_j)]*(Z_{16}-Z_{15})+Z_{15}$; $Z_{15}$ is the smaller one of $(HA_k+HA_{k+1})/2$ and $(GA_k+GA_{k+1})/2$, and $Z_{16}$ is the larger one of $(HA_k+HA_{k+1})/2$ and $(GA_k+GA_k+1)/2$.

$$\text{Target scene focal point value} = (Z_{17} + Z_{18} + Z_{19} + Z_{20})/4$$

where $Z_{17}=[(R_4-C_k)/(C_{k+1}-C_k)]*(W_{k+1}-W_k)+W_k$, $Z_{18}=[(R_4-C_k)/(C_{k+1}-C_k)]*(V_{k+1}-V_k)+V_k$, $Z_{19}=[(R_4-C_k)/(C_{k+1}-C_k)]*(HB_{k+1}-HB_k)+HB_k$, and $Z_{20}=[(R_4-C_k)/(C_{k+1}-C_k)]*(GB_{k+1}-GB_k)+GB_k$. In addition, the target scene focal length is an actual focal length (that is, $FS_4$) of the target camera device.

S305. Display the virtual content according to the target virtual scene parameters.

For a specific implementation of operation S305, reference may be made to the implementation of operation S203 in FIG. 2. Details are not described herein again.

In the examples of this application, a correspondence between reference photographing parameters and virtual scene parameters is determined by comparing a virtual image with a real image, and then a reference dataset is configured. Photographing parameters of a target camera device and the reference dataset are obtained, target virtual scene parameters corresponding to virtual content to be photographed by the target camera device are determined according to the photographing parameters of the target camera device and the preset reference dataset, and the virtual content is displayed according to the target virtual scene parameters, to cause the target camera device to photograph the virtual content. It can be seen that, the target virtual scene parameters corresponding to the virtual content to be photographed by the target camera device are determined through the reference dataset, so that efficiency of configuring the virtual scene parameters and real-time performance of displaying the virtual content can be improved. In addition, since the target virtual scene parameters are calculated based on the reference dataset, and the reference dataset is determined when the real image matches the virtual image, in the photographed content, the transition between the virtual content displayed according to the target virtual scene parameters and the real scene is smoother, thereby making the perception of the object more realistic when viewing the photographed content.

The method in the examples of this application is described in detail above. For ease of better implementing the foregoing solutions in the examples of this application, an apparatus in an example of this application is correspondingly provided below.

Figure 5:
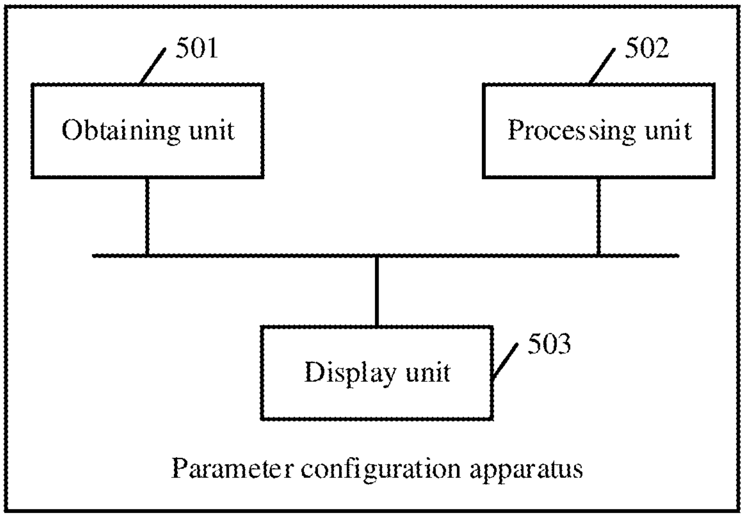
FIG. 5 is a schematic structural diagram of a parameter configuration apparatus according to an example of this application.

FIG. 5 is a schematic structural diagram of a parameter configuration apparatus according to an example of this application. The apparatus may be mounted on a computer device. The computer device may be specifically the display device 102 shown in FIG. 1. The parameter configuration apparatus shown in FIG. 5 may be configured to perform some or all of the functions in the method examples described in FIG. 2 and FIG. 3. Referring to FIG. 5, detailed descriptions of units are as follows:

An obtaining unit 501 is configured to obtain photographing parameters of a target camera device; and configured to obtain a reference dataset, the reference dataset including a correspondence between reference photographing parameters and virtual scene parameters; and A processing unit 502 is configured to determine, according to the photographing parameters of the target camera device and a reference dataset, target virtual scene parameters corresponding to virtual content to be photographed by the target camera device; and A display unit 503 is configured to display the to-be-photographed virtual content according to the target virtual scene parameters, to cause the target camera device to photograph the to-be-photographed virtual content.

In an implementation, the reference photographing parameters are configured for describing photographing parameters of a reference camera device, the reference camera device is a real camera device, and the virtual scene parameters are configured for describing photographing parameters of a virtual camera device in a virtual scene. The processing unit 502 is further configured to: configure a reference dataset according to photographing parameters of a reference camera device and photographing parameters of a virtual camera device.

In an implementation, the reference camera device includes a plurality of groups of photographing parameters. A configuration process of the reference dataset includes:

obtaining a first group of photographing parameters of the reference camera device, and photographing a real image of a reference object based on the first group of photographing parameters by using the reference camera device, where the first group of photographing parameters is any one of the plurality of groups of photographing parameters;

adjusting a virtual object corresponding to the reference object by adjusting the virtual scene parameters;

photographing the virtual object based on the first group of photographing parameters by using the reference camera device, to obtain a virtual image;

comparing the virtual image with the real image, and recording target virtual scene parameters corresponding to a case that the virtual image matches the real image; and A correspondence between the first group of photographing parameters and the target virtual scene parameters is established, and the correspondence is added to the reference dataset.

In an implementation, the reference dataset includes M*N*P groups of photographing parameters, each group of photographing parameters includes a focal length, an aperture value, and a focal point value, M is a quantity of candidate focal lengths, N is a quantity of candidate aperture values, P is a quantity of candidate focal point values, and M, N, and P are all positive integers; and the first group of photographing parameters includes an $i^{th}$ candidate focal length, a $j^{th}$ candidate aperture value, and a $k^{th}$ candidate focal point value, where i is a positive integer less than M, j is a positive integer less than N, and k is a positive integer less than P; and the processing unit 502 is configured to adjust a virtual object corresponding to the reference object by adjusting the virtual scene parameters, and is specifically configured to:

determine the $i^{th}$ candidate focal length as a virtual focal length of the virtual camera device, and configure a virtual aperture value and a virtual focal point value of the virtual camera device.

In an implementation, the processing unit 502 is configured to determine, according to the photographing parameters of the target camera device and a reference dataset, target virtual scene parameters corresponding to virtual content to be photographed by the target camera device, and is specifically configured to:

determine, according to a relationship between the photographing parameters of the target camera device and the photographing parameters of the reference camera device and a correspondence between the photographing parameters of the reference camera device and the photographing parameters of the virtual camera device, the target virtual scene parameters corresponding to the virtual content to be photographed by the target camera device.

In an implementation, the reference dataset includes M*N*P groups of photographing parameters, each group of photographing parameters includes a focal length, an aperture value, and a focal point value, M is a quantity of candidate focal lengths, N is a quantity of candidate aperture values, P is a quantity of candidate focal point values, and M, N, and P are all positive integers; and the photographing parameters of the target camera device include an actual focal length, an actual aperture value, and an actual focal point value; and the processing unit 502 is configured to determine, according to the photographing parameters of the target camera device and a reference dataset, target virtual scene parameters corresponding to virtual content to be photographed by the target camera device, and is specifically configured to:

determine the actual focal length as a scene focal length of a target virtual scene corresponding to the virtual content to be photographed by the target camera device; and determine, if the actual focal length is consistent with an $i^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length; or determine, if the actual focal length is between an $i^{th}$ candidate focal length and an $(i+1)^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, where i is a positive integer less than M.

In an implementation, the processing unit 502 is configured to determine a scene aperture value and a scene focal point value of the target virtual scene according to a relationship between the actual aperture value and the actual focal point value and a candidate aperture value and a candidate focal point value that are associated with the $i^{th}$ candidate focal length, and is specifically configured to:

determine, if the actual aperture value is consistent with a $j^{th}$ candidate aperture value associated with the $i^{th}$ candidate focal length, a scene aperture value and a scene focal point value of the target virtual scene according to a relationship between the actual focal point value and a candidate focal point value associated with the $j^{th}$ candidate aperture value; or determine, if the actual aperture value is between a $j^{th}$ candidate aperture value and a $(j+1)^{th}$ candidate aperture value that are associated with the $i^{th}$ candidate focal length, a scene aperture value and a scene focal point value of the target virtual scene according to a relationship between the actual focal point value and a candidate focal point value associated with the $j^{th}$ candidate aperture value and a relationship between the actual focal point value and a candidate focal point value associated with the $(j+1)^{th}$ candidate aperture value, where j is a positive integer less than N.

In an implementation, the processing unit 502 is configured to determine a scene aperture value and a scene focal point value of the target virtual scene according to a relationship between the actual focal point value and a candidate focal point value associated with the $j^{th}$ candidate aperture value, and is specifically configured to:

determine, if the actual focal point value is consistent with a $k^{th}$ candidate focal point value associated with the $j^{th}$ candidate aperture value, a virtual aperture value and a virtual focal point value that correspond to the $k^{th}$ candidate focal point value as the scene aperture value and the scene focal point value of the target virtual scene respectively; or calculate, if the actual focal point value is between a $k^{th}$ candidate focal point value and a $(k+1)^{th}$ candidate focal point value that are associated with the $j^{th}$ candidate aperture value, a scene aperture value and a scene focal point value of the target virtual scene according to a virtual aperture value and a virtual focal point value that correspond to the $k^{th}$ candidate focal point value, and a virtual aperture value and a virtual focal point value that correspond to the $(k+1)^{th}$ candidate focal point value, where k is a positive integer less than P.

In an implementation, the processing unit 502 is configured to determine a scene aperture value and a scene focal point value of the target virtual scene according to a relationship between the actual focal point value and a candidate focal point value associated with the $j^{th}$ candidate aperture value and a relationship between the actual focal point value and a candidate focal point value associated with the $(j+1)^{th}$ candidate aperture value, and is specifically configured to:

calculate, if the actual focal point value is consistent with a $k^{th}$ candidate focal point value associated with the $j^{th}$ candidate aperture value, a scene aperture value and a scene focal point value of the target virtual scene according to a virtual aperture value and a virtual focal point value that correspond to the $k^{th}$ candidate focal point value associated with the $j^{th}$ candidate aperture value, and a virtual aperture value and a virtual focal point value that correspond to a $k^{th}$ candidate focal point value associated with the $(j+1)^{th}$ candidate aperture value; or calculate, if the actual focal point value is between a $k^{th}$ candidate focal point value and a $(k+1)^{th}$ candidate focal point value that are associated with the $j^{th}$ candidate aperture value, a scene aperture value and a scene focal point value of the target virtual scene according to a virtual aperture value and a virtual focal point value that correspond to the $k^{th}$ candidate focal point value and the $(k+1)^{th}$ candidate focal point value that are associated with the $j^{th}$ candidate aperture value, and a virtual aperture value and a virtual focal point value that correspond to a $k^{th}$ candidate focal point value and a $(k+1)^{th}$ candidate focal point value that are associated with the $(j+1)^{th}$ candidate aperture value, where k is a positive integer less than P.

In an implementation, the processing unit 502 is configured to determine a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, and is specifically configured to:

determine, if the actual aperture value is consistent with a $j^{th}$ candidate aperture value associated with the $i^{th}$ candidate focal length, a scene aperture value and a scene focal point value of the target virtual scene according to a relationship between the actual focal point value and a candidate focal point value associated with the $j^{th}$ candidate aperture value associated with the $i^{th}$ candidate focal length and a relationship between the actual focal point value and a candidate focal point value associated with a $j^{th}$ candidate aperture value associated with the $(i+1)^{th}$ candidate focal length; or determine, if the actual aperture value is between a $j^{th}$ candidate aperture value and a $(j+1)^{th}$ candidate aperture value that are associated with the $i^{th}$ candidate focal length, a scene aperture value and a scene focal point value of the target virtual scene according to a relationship between the actual focal point value and candidate focal point values associated with the $j^{th}$ candidate aperture value and the $(j+1)^{th}$ candidate aperture value that are associated with the $i^{th}$ candidate focal length and a relationship between the actual focal point value and candidate focal point values associated with a $j^{th}$ candidate aperture value and a $(j+1)^{th}$ candidate aperture value that are associated with the $(i+1)^{th}$ candidate focal length, where j is a positive integer less than N.

In an implementation, the processing unit 502 is configured to determine a scene aperture value and a scene focal point value of the target virtual scene according to a relationship between the actual focal point value and a candidate focal point value associated with the $j^{th}$ candidate aperture value associated with the $i^{th}$ candidate focal length and a relationship between the actual focal point value and a candidate focal point value associated with a $j^{th}$ candidate aperture value associated with the $(i+1)^{th}$ candidate focal length, and is specifically configured to:

calculate, if the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value associated with the $i^{th}$ candidate focal length, and a virtual aperture value and a virtual focal point value that correspond to a $k^{th}$ candidate focal point value associated with the $j^{th}$ candidate aperture value associated with the $(i+1)^{th}$ candidate focal length; or calculate, if the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value and the $(k+1)^{th}$ candidate focal point value that are associated with the $j^{th}$ candidate aperture value associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value associated with the $(i+1)^{th}$ candidate focal length, where k is a positive integer less than P.

In an implementation, the processing unit 502 is configured to determine a scene aperture value and a scene focal point value of the target virtual scene according to a relationship between the actual focal point value and candidate focal point values associated with the $j^{th}$ candidate aperture value and the $(j+1)^{th}$ candidate aperture value that are associated with the $i^{th}$ candidate focal length and a relationship between the actual focal point value and candidate focal point values associated with a $j^{th}$ candidate aperture value and a $(j+1)^{th}$ candidate aperture value that are associated with the $(i+1)^{th}$ candidate focal length, and is specifically configured to:

calculate, if the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value associated with the $j^{th}$ candidate aperture value and the $(j+1)^{th}$ candidate aperture value that are associated with the $(i+1)^{th}$ candidate focal length; or calculate, if the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $(i+1)^{th}$ candidate focal length, where k is a positive integer less than P.

According to an example of this application, some of the operations involved in the parameter configuration methods shown in FIG. 2 and FIG. 3 may be performed by units in the parameter configuration apparatus shown in FIG. 5. For example, operation S201 shown in FIG. 2 may be performed by the obtaining unit 501 shown in FIG. 5, operation S202 may be performed by the processing unit 502 shown in FIG. 5, and operation S203 may be performed by the display unit 503 shown in FIG. 5. Operation S302 and operation S303 shown in FIG. 3 may be performed by the obtaining unit 501 shown in FIG. 5, operation S301 and operation S304 may be performed by the processing unit 502 shown in FIG. 5, and operation S305 may be performed by the display unit 503 shown in FIG. 5. A part or all of the units of the parameter configuration apparatus shown in FIG. 5 may be combined into one or several other units, or one (or more) of the units may be divided into multiple units of smaller functions. In this way, same operations can be implemented without affecting implementation of the technical effects of the examples of this application. The foregoing units are divided based on logical functions. In an actual application, a function of one unit may be implemented by multiple units, or functions of multiple units are implemented by one unit. In another example of this application, the parameter configuration apparatus may also include another unit. During practical application, these functions may also be cooperatively implemented by another unit and may be cooperatively implemented by multiple units.

According to another example of this application, a computer program (including program code) that can perform the operations involved in the corresponding methods shown in FIG. 2 and FIG. 3 may run on a general computing apparatus of a computer including processing elements and storage elements such as a central processing unit (CPU), a random access memory (RAM), and a read-only memory (ROM), to construct the parameter configuration apparatus shown in FIG. 5, and implement the parameter configuration method according to the examples of this application. The computer program may be recorded in, for example, a computer readable recording medium, and may be loaded into the foregoing computing apparatus by using the computer readable recording medium, and run in the computing apparatus.

A principle and beneficial effects of resolving problems by the parameter configuration apparatus provided in the examples of this application are similar to those of the parameter configuration method in the method example of this application. Reference may be made to the principle and beneficial effects of implementation of the method. For concise descriptions, details are not described herein again.

Figure 6:
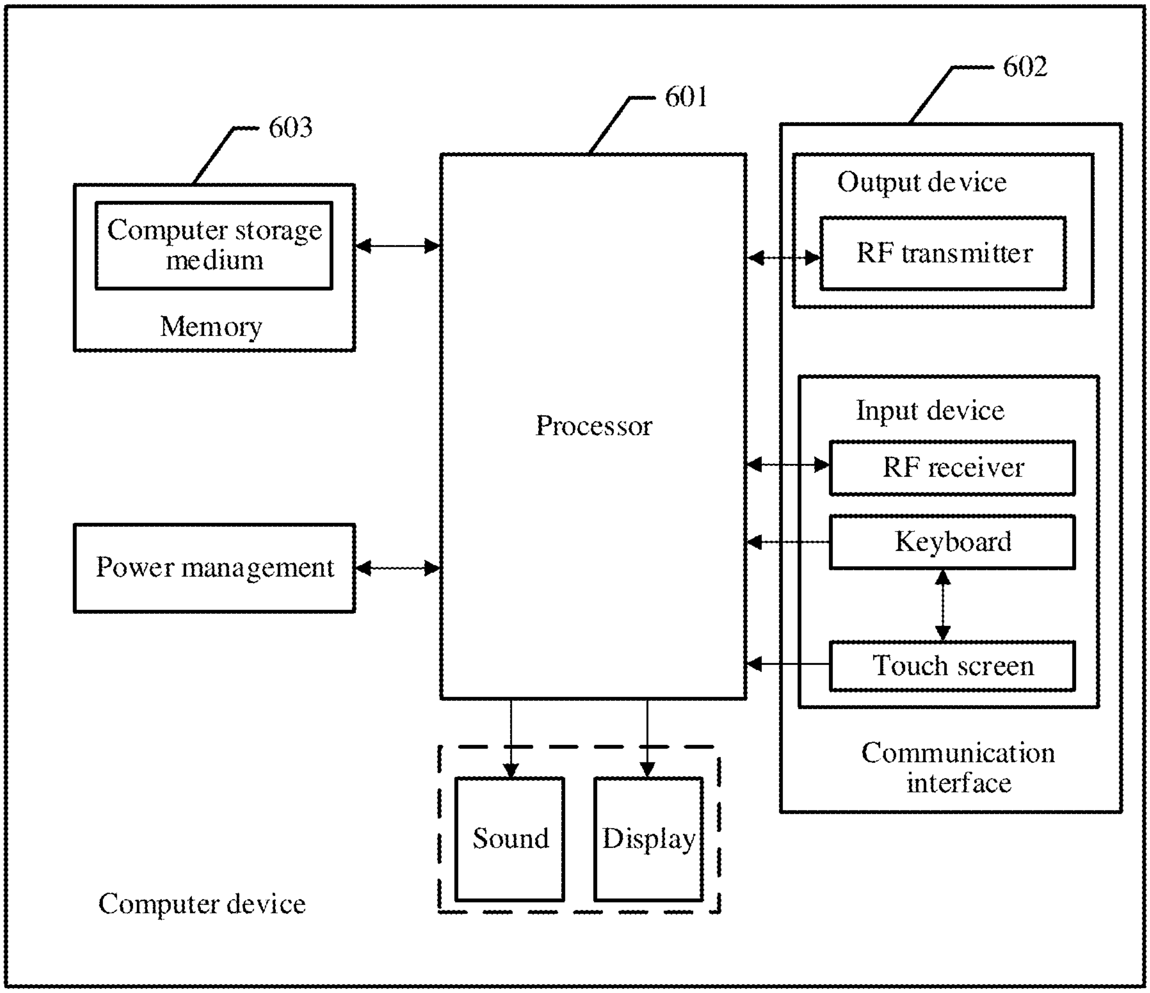
FIG. 6 is a schematic structural diagram of a computing device according to an example of this application.

FIG. 6 is a schematic structural diagram of a computer device according to an example of this application. As shown in FIG. 6, the computer device includes at least a processor 601, a communication interface 602, and a memory 603. The processor 601, the communication interface 602, and the memory 603 may be connected via a bus or in another manner. The processor 601 (or referred to as a central processing unit (CPU)) is a computing core and control core of the terminal. The processor can parse various instructions in the terminal and process various data of the terminal. For example, the CPU may be configured to parse an on/off instruction transmitted by a user to the terminal, and control the terminal to perform an on/off operation. For another example, the CPU may transmit interaction data between internal structures of the terminal, and the like. The communication interface 602 may include a standard wired interface, a wireless interface (for example, a Wi-Fi or mobile communication interface), and may be controlled by the processor 601 to receive/transmit data. The communication interface 602 may be further configured to transmit and exchange data within the terminal. The memory 603 is a memory device in the terminal and is configured to store programs and data. The memory 603 herein may include a built-in memory of the terminal, and may certainly further includes an expanded memory supported by the terminal. The memory 603 provides storage space. The storage space stores an operating system of the terminal. The operating system may include, but not limited to, an Android system, an iOS system, a Windows Phone system, and the like. This is not limited in this application.

An example of this application further provides a computer-readable storage medium (memory). The computer-readable storage medium is a memory device in the terminal and is configured to store programs and data. The computer-readable storage medium herein may include a built-in storage medium of the terminal, and may certainly further includes an expanded storage medium supported by the terminal. The computer-readable storage medium provides a storage space, storing a processing system of the terminal. In addition, the storage space further stores one or more instructions suitable for being loaded and executed by the processor 601. The instructions may be one or more computer programs (including program code). The computer-readable storage medium herein may be a high speed RAM memory or a non-volatile memory, for example, at least one magnetic disk memory; or may be at least one computer-readable storage medium located away from the foregoing processor.

In an implementation, the computer device may be specifically the display device 102 shown in FIG. 1. The processor 601 performs the following operations by running the executable program code in the memory 603:

obtaining photographing parameters of a target camera device through the communication interface 602;

obtaining a reference dataset, the reference dataset including a correspondence between reference photographing parameters and virtual scene parameters; and determining, according to the photographing parameters of the target camera device and a reference dataset, target virtual scene parameters corresponding to virtual content to be photographed by the target camera device; and displaying the virtual content according to the target virtual scene parameters, to cause the target camera device to photograph the virtual content.

In an exemplary example, the reference photographing parameters are configured for describing photographing parameters of a reference camera device, and the virtual scene parameters are configured for describing photographing parameters of a virtual camera device. The processor 601 further performs the following operations by running the executable program code in the memory 603:

Configure a reference dataset according to photographing parameters of a reference camera device and photographing parameters of a virtual camera device.

In an exemplary example, the reference camera device includes a plurality of groups of photographing parameters; and A specific example of the configuration process of the reference dataset is:

obtaining a first group of photographing parameters of the reference camera device, and photographing a real image of a reference object based on the first group of photographing parameters by using the reference camera device, where the first group of photographing parameters is any one of the plurality of groups of photographing parameters;

adjusting a virtual object corresponding to the reference object by adjusting the virtual scene parameters;

photographing the virtual object based on the first group of photographing parameters by using the reference camera device, to obtain a virtual image;

comparing the virtual image with the real image, and recording target virtual scene parameters corresponding to a case that the virtual image matches the real image; and A correspondence between the first group of photographing parameters and the target virtual scene parameters is established, and the correspondence is added to the reference dataset.

In an exemplary example, the reference dataset includes M*N*P groups of photographing parameters, each group of photographing parameters includes a focal length, an aperture value, and a focal point value, M is a quantity of candidate focal lengths, N is a quantity of candidate aperture values, P is a quantity of candidate focal point values, and M, N, and P are all positive integers; and the first group of photographing parameters includes an $i^{th}$ candidate focal length, a $j^{th}$ candidate aperture value, and a $k^{th}$ candidate focal point value, where i is a positive integer less than M, j is a positive integer less than N, and k is a positive integer less than P; and A specific example in which the processor 601 adjusts a virtual object corresponding to the reference object by adjusting the virtual scene parameters, and is:

determining the $i^{th}$ candidate focal length as a virtual focal length of the virtual camera device, and configuring a virtual aperture value and a virtual focal point value of the virtual camera device.

In an exemplary example, a specific example in which the processor 601 determines, according to the photographing parameters of the target camera device and a reference dataset, target virtual scene parameters corresponding to virtual content to be photographed by the target camera device is:

determining, according to a relationship between the photographing parameters of the target camera device and the photographing parameters of the reference camera device and a correspondence between the photographing parameters of the reference camera device and the photographing parameters of the virtual camera device, the target virtual scene parameters corresponding to the virtual content to be photographed by the target camera device.

In an exemplary example, the reference dataset includes M*N*P groups of photographing parameters, each group of photographing parameters includes a focal length, an aperture value, and a focal point value, M is a quantity of candidate focal lengths, N is a quantity of candidate aperture values, P is a quantity of candidate focal point values, and M, N, and P are all positive integers; and the photographing parameters of the target camera device include an actual focal length, an actual aperture value, and an actual focal point value; and A specific example in which the processor 601 determines, according to the photographing parameters of the target camera device and a reference dataset, target virtual scene parameters corresponding to virtual content to be photographed by the target camera device is:

determining the actual focal length as a scene focal length of a target virtual scene corresponding to the virtual content to be photographed by the target camera device; and determining, if the actual focal length is consistent with an $i^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length; or determining, if the actual focal length is between an $i^{th}$ candidate focal length and an $(i+1)^{th}$ candidate focal length of the reference camera device, a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, where i is a positive integer less than M.

In an exemplary example, a specific example in which the processor 601 determines a scene aperture value and a scene focal point value of the target virtual scene according to a relationship between the actual aperture value and the actual focal point value and a candidate aperture value and a candidate focal point value that are associated with the $i^{th}$ candidate focal length is:

determining, if the actual aperture value is consistent with a $j^{th}$ candidate aperture value associated with the $i^{th}$ candidate focal length, a scene aperture value and a scene focal point value of the target virtual scene according to a relationship between the actual focal point value and a candidate focal point value associated with the $j^{th}$ candidate aperture value; or determining, if the actual aperture value is between a $j^{th}$ candidate aperture value and a $(j+1)^{th}$ candidate aperture value that are associated with the $i^{th}$ candidate focal length, a scene aperture value and a scene focal point value of the target virtual scene according to a relationship between the actual focal point value and a candidate focal point value associated with the $j^{th}$ candidate aperture value and a relationship between the actual focal point value and a candidate focal point value associated with the $(j+1)^{th}$ candidate aperture value, where j is a positive integer less than N.

In an exemplary example, a specific example in which the processor 601 determines a scene aperture value and a scene focal point value of the target virtual scene according to a relationship between the actual focal point value and a candidate focal point value associated with the $j^{th}$ candidate aperture value is:

determining, if the actual focal point value is consistent with a $k^{th}$ candidate focal point value associated with the $j^{th}$ candidate aperture value, a virtual aperture value and a virtual focal point value that correspond to the $k^{th}$ candidate focal point value as the scene aperture value and the scene focal point value of the target virtual scene respectively; or calculating, if the actual focal point value is between a $k^{th}$ candidate focal point value and a $(k+1)^{th}$ candidate focal point value that are associated with the $j^{th}$ candidate aperture value, a scene aperture value and a scene focal point value of the target virtual scene according to a virtual aperture value and a virtual focal point value that correspond to the $k^{th}$ candidate focal point value, and a virtual aperture value and a virtual focal point value that correspond to the $(k+1)^{th}$ candidate focal point value, where k is a positive integer less than P.

In an exemplary example, a specific example in which the processor 601 determines a scene aperture value and a scene focal point value of the target virtual scene according to a relationship between the actual focal point value and a candidate focal point value associated with the $j^{th}$ candidate aperture value and a relationship between the actual focal point value and a candidate focal point value associated with the $(j+1)^{th}$ candidate aperture value is:

calculating, if the actual focal point value is consistent with a $k^{th}$ candidate focal point value associated with the $j^{th}$ candidate aperture value, a scene aperture value and a scene focal point value of the target virtual scene according to a virtual aperture value and a virtual focal point value that correspond to the $k^{th}$ candidate focal point value associated with the $j^{th}$ candidate aperture value, and a virtual aperture value and a virtual focal point value that correspond to a $k^{th}$ candidate focal point value associated with the $(j+1)^{th}$ candidate aperture value; or calculating, if the actual focal point value is between a $k^{th}$ candidate focal point value and a $(k+1)^{th}$ candidate focal point value that are associated with the $j^{th}$ candidate aperture value, a scene aperture value and a scene focal point value of the target virtual scene according to a virtual aperture value and a virtual focal point value that correspond to the $k^{th}$ candidate focal point value and the $(k+1)^{th}$ candidate focal point value that are associated with the $j^{th}$ candidate aperture value, and a virtual aperture value and a virtual focal point value that correspond to a $k^{th}$ candidate focal point value and a $(k+1)^{th}$ candidate focal point value that are associated with the $(j+1)^{th}$ candidate aperture value, where k is a positive integer less than P.

In an exemplary example, a specific example in which the processor 601 determines a scene aperture value and a scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length is:

determining, if the actual aperture value is consistent with a $j^{th}$ candidate aperture value associated with the $i^{th}$ candidate focal length, a scene aperture value and a scene focal point value of the target virtual scene according to a relationship between the actual focal point value and a candidate focal point value associated with the $j^{th}$ candidate aperture value associated with the $i^{th}$ candidate focal length and a relationship between the actual focal point value and a candidate focal point value associated with a $j^{th}$ candidate aperture value associated with the $(i+1)^{th}$ candidate focal length; or determining, if the actual aperture value is between a $j^{th}$ candidate aperture value and a $(j+1)^{th}$ candidate aperture value that are associated with the $i^{th}$ candidate focal length, a scene aperture value and a scene focal point value of the target virtual scene according to a relationship between the actual focal point value and candidate focal point values associated with the $j^{th}$ candidate aperture value and the $(j+1)^{th}$ candidate aperture value that are associated with the $i^{th}$ candidate focal length and a relationship between the actual focal point value and candidate focal point values associated with a $j^{th}$ candidate aperture value and a $(j+1)^{th}$ candidate aperture value that are associated with the $(i+1)^{th}$ candidate focal length, where j is a positive integer less than N.

In an exemplary example, a specific example in which the processor 601 determines a scene aperture value and a scene focal point value of the target virtual scene according to a relationship between the actual focal point value and a candidate focal point value associated with the $j^{th}$ candidate aperture value associated with the $i^{th}$ candidate focal length and a relationship between the actual focal point value and a candidate focal point value associated with a $j^{th}$ candidate aperture value associated with the $(i+1)^{th}$ candidate focal length is:

calculating, if the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value associated with the $i^{th}$ candidate focal length, and a virtual aperture value and a virtual focal point value that correspond to a $k^{th}$ candidate focal point value associated with the $j^{th}$ candidate aperture value associated with the $(i+1)^{th}$ candidate focal length; or calculating, if the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value and the $(k+1)^{th}$ candidate focal point value that are associated with the $j^{th}$ candidate aperture value associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value associated with the $(i+1)^{th}$ candidate focal length, where k is a positive integer less than P.

In an exemplary example, a specific example in which the processor 601 determines a scene aperture value and a scene focal point value of the target virtual scene according to a relationship between the actual focal point value and candidate focal point values associated with the $j^{th}$ candidate aperture value and the $(j+1)^{th}$ candidate aperture value that are associated with the $i^{th}$ candidate focal length and a relationship between the actual focal point value and candidate focal point values associated with a $j^{th}$ candidate aperture value and a $(j+1)^{th}$ candidate aperture value that are associated with the $(i+1)^{th}$ candidate focal length is:

calculating, if the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value associated with the $j^{th}$ candidate aperture value and the $(j+1)^{th}$ candidate aperture value that are associated with the $(i+1)^{th}$ candidate focal length; or calculating, if the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $(i+1)^{th}$ candidate focal length, where k is a positive integer less than P.

Based on a same inventive idea, a principle and beneficial effects of resolving problems by the computer device provided in the examples of this application are similar to those of the parameter configuration method in the method examples of this application. Reference may be made to the principle and beneficial effects of implementation of the method. For concise descriptions, details are not described herein again.

An example of this application further provides a computer-readable storage medium. The computer-readable storage medium has one or more instructions stored therein. The one or more instructions are adapted to be loaded and executed by a processor to implement the parameter configuration method according to the foregoing method examples.

An example of this application further provides a computer program product including instructions, and the computer program product, when run on a computer, causes the computer to perform the parameter configuration method according to the foregoing method examples.

An example of this application further provides a computer program product or a computer program. The computer program product or the computer program includes computer instructions. The computer instructions are stored in a computer-readable storage medium. A processor of a computer device reads the computer instructions from the computer-readable storage medium, and executes the computer instructions, to cause the computer device to perform the foregoing parameter configuration method.

The operations of the methods of the examples of this application may be reordered, combined, or deleted according to an actual requirement.

The modules of the apparatuses of the examples of this application may be combined, divided, or deleted according to an actual requirement.

Persons of ordinary skill in the art may understand that all or some of the operations of the methods in the foregoing examples may be implemented by a program instructing relevant hardware. The program may be stored in a computer-readable storage medium. The readable storage medium may include: a flash disk, a read-only memory (ROM), a random access memory (RAM), a magnetic disk, or an optical disc.

The contents disclosed above are merely examples of this application, but not intended to limit the scope of this application. Persons of ordinary skill in the art can understand all or a part of the procedures for implementing the foregoing examples, and any equivalent variation made by them according to the claims of this application shall still fall within the scope of this application.

What is claimed is:

1. A method, comprising:

obtaining photographing parameters of a camera, wherein the photographing parameters of the camera are set in real time on the camera and are configured for photographing a fused picture of a real scene and virtual content displayed on a display device;

determining, based on the photographing parameters of the camera and a reference dataset, target virtual scene parameters corresponding to virtual content to be photographed by the camera, the reference dataset comprising a correspondence between reference photographing parameters and virtual scene parameters; and displaying the virtual content according to the target virtual scene parameters; and causing the camera to photograph the fused picture of the real scene and the virtual content displayed on the display device.

2. The method according to claim 1, wherein the reference photographing parameters are configured for describing photographing parameters of a reference camera, the virtual scene parameters are configured to describe photographing parameters of a virtual camera in a virtual scene, and the method further comprises:

configuring the reference dataset according to the photographing parameters of the reference camera and the photographing parameters of the virtual camera.

3. The method according to claim 2, wherein the reference camera comprises a plurality of groups of photographing parameters, and a configuration process of the reference dataset comprises:

obtaining a first group of photographing parameters of the reference camera, and photographing a real image of a reference object based on the first group of photographing parameters using the reference camera, wherein the first group of photographing parameters is one of the plurality of groups of photographing parameters;

adjusting a virtual object corresponding to the reference object by adjusting the virtual scene parameters;

photographing the virtual object based on the first group of photographing parameters using the reference camera, to obtain a virtual image;

comparing the virtual image with the real image, and recording target virtual scene parameters based on determining that the virtual image matches the real image; and establishing a correspondence between the first group of photographing parameters and the target virtual scene parameters, and adding the correspondence to the reference dataset.

4. The method according to claim 3, wherein:

the reference dataset comprises M*N*P groups of photographing parameters, each group of photographing parameters comprises a focal length, an aperture value, and a focal point value, M is a quantity of candidate focal lengths, N is a quantity of candidate aperture values, P is a quantity of candidate focal point values, and M, N, and P are all positive integers; and the first group of photographing parameters comprises an $i^{th}$ candidate focal length, a $j^{th}$ candidate aperture value, and a $k^{th}$ candidate focal point value, wherein i is a positive integer less than M, j is a positive integer less than N, and k is a positive integer less than P; and the adjusting the virtual object comprises:

determining the $i^{th}$ candidate focal length as a virtual focal length of the virtual camera, and configuring a virtual aperture value and a virtual focal point value of the virtual camera.

5. The method according to claim 3, wherein the photographing the real image of the reference object based on the first group of photographing parameters using the reference camera comprises:

photographing images of N reference objects in the real scene using the reference camera, wherein:

the N reference objects are arranged in ascending order of distances from the reference camera, are located on a same straight line, and are at equal intervals from each other, a distance between the reference camera and a closest reference object is the same as an interval between the reference objects, the first group of photographing parameters of the reference camera comprises a focal length, an aperture value, and a focal point value, and a focal point corresponding to the focal point value is on one of N−x reference objects at distances from the reference camera less than a distance threshold among the N reference objects, wherein N is an integer greater than 1, and x<N; and the photographing the virtual object comprises:

photographing, by the reference camera based on the first group of photographing parameters, images of the N-x reference objects at the distances from the reference camera less than the distance threshold among the N reference objects, and x virtual objects in the virtual scene displayed on a display device at the interval from an $(N-x)^{th}$ reference object, wherein the x virtual objects correspond to x reference objects at a distance from the reference camera greater than the distance threshold among the N reference objects; and the comparing the virtual image with the real image, and the recording target virtual scene parameters comprises:

comparing sizes of the x virtual objects in the virtual image with sizes of the x reference objects in the corresponding real image, adjusting the virtual scene parameters according to a comparison result, to cause the sizes of the x virtual objects in the virtual image to match the sizes of the x reference objects in the corresponding real image, and recording virtual scene parameters adjusted during matching as the target virtual scene parameters.

6. The method according to claim 2, wherein the determining the target virtual scene parameters comprises:

determining, based on a relationship between the photographing parameters of the camera and the photographing parameters of the reference camera and a correspondence between the photographing parameters of the reference camera and the photographing parameters of the virtual camera, the target virtual scene parameters corresponding to the virtual content to be photographed by the camera.

7. The method according to claim 6, wherein the reference dataset comprises M*N*P groups of photographing parameters, each group of photographing parameters comprises a focal length, an aperture value, and a focal point value, M is a quantity of candidate focal lengths, N is a quantity of candidate aperture values, P is a quantity of candidate focal point values, and M, N, and P are positive integers; and the photographing parameters of the camera comprise an actual focal length, an actual aperture value, and an actual focal point value; and the determining the target virtual scene parameters comprises:

determining the actual focal length as a scene focal length of a target virtual scene corresponding to the virtual content to be photographed by the camera; and determining, based on that the actual focal length is consistent with an $i^{th}$ candidate focal length of the reference camera, a scene aperture value and a scene focal point value of the target virtual scene according to a relationship between the actual aperture value and the actual focal point value and a candidate aperture value and a candidate focal point value that are associated with the $i^{th}$ candidate focal length; or determining, based on that the actual focal length is between an $i^{th}$ candidate focal length and an $(i+1)^{th}$ candidate focal length of the reference camera, the scene aperture value and the scene focal point value of the target virtual scene according to a relationship between the actual aperture value and the actual focal point value and a candidate aperture value and a candidate focal point value that are associated with the $i^{th}$ candidate focal length and a relationship between the actual aperture value and the actual focal point value and a candidate aperture value and a candidate focal point value that are associated with the $(i+1)^{th}$ candidate focal length, wherein i is a positive integer less than M.

8. The method according to claim 7, wherein the determining the scene aperture value and the scene focal point value of the target virtual scene according to the relationship between the actual aperture value and the actual focal point value and a candidate aperture value and the candidate focal point value that are associated with the $i^{th}$ candidate focal length comprises:

determining, based on that the actual aperture value is consistent with a $j^{th}$ candidate aperture value associated with the $i^{th}$ candidate focal length, the scene aperture value and the scene focal point value of the target virtual scene according to the relationship between the actual focal point value and the candidate focal point value associated with the $j^{th}$ candidate aperture value; or determining, based on that the actual aperture value is between a $j^{th}$ candidate aperture value and a $(j+1)^{th}$ candidate aperture value that are associated with the $i^{th}$ candidate focal length, the scene aperture value and the scene focal point value of the target virtual scene according to the relationship between the actual focal point value and the candidate focal point value associated with the $j^{th}$ candidate aperture value and the relationship between the actual focal point value and the candidate focal point value associated with the $(j+1)^{th}$ candidate aperture value, wherein j is a positive integer less than N.

9. The method according to claim 8, wherein the determining the scene aperture value and the scene focal point value of the target virtual scene according to the relationship between the actual focal point value and the candidate focal point value associated with the $j^{th}$ candidate aperture value comprises:

determining, based on that the actual focal point value is consistent with a $k^{th}$ candidate focal point value associated with the $j^{th}$ candidate aperture value, a virtual aperture value and a virtual focal point value that correspond to the $k^{th}$ candidate focal point value as the scene aperture value and the scene focal point value of the target virtual scene respectively; or calculating, based on that the actual focal point value is between a $k^{th}$ candidate focal point value and a $(k+1)^{th}$ candidate focal point value that are associated with the $j^{th}$ candidate aperture value, a scene aperture value and a scene focal point value of the target virtual scene according to a virtual aperture value and a virtual focal point value that correspond to the $k^{th}$ candidate focal point value, and a virtual aperture value and a virtual focal point value that correspond to the $(k+1)^{th}$ candidate focal point value, wherein k is a positive integer less than P.

10. The method according to claim 8, wherein the determining the scene aperture value and the scene focal point value of the target virtual scene according to the relationship between the actual focal point value and the candidate focal point value associated with the $j^{th}$ candidate aperture value and the relationship between the actual focal point value and the candidate focal point value associated with the $(j+1)^{th}$ candidate aperture value comprises:

calculating, based on that the actual focal point value is consistent with a $k^{th}$ candidate focal point value associated with the $j^{th}$ candidate aperture value, the scene aperture value and the scene focal point value of the target virtual scene according to a virtual aperture value and a virtual focal point value that correspond to the $k^{th}$ candidate focal point value associated with the $j^{th}$ candidate aperture value, and the virtual aperture value and the virtual focal point value that correspond to a $k^{th}$ candidate focal point value associated with the $(j+1)^{th}$ candidate aperture value; or calculating, based on that the actual focal point value is between a $k^{th}$ candidate focal point value and a $(k+1)^{th}$ candidate focal point value that are associated with the $j^{th}$ candidate aperture value, the scene aperture value and the scene focal point value of the target virtual scene according to the virtual aperture value and the virtual focal point value that correspond to the $k^{th}$ candidate focal point value and the $(k+1)^{th}$ candidate focal point value that are associated with the $j^{th}$ candidate aperture value, and the virtual aperture value and the virtual focal point value that correspond to a $k^{th}$ candidate focal point value and a $(k+1)^{th}$ candidate focal point value that are associated with the $(j+1)^{th}$ candidate aperture value, wherein k is a positive integer less than P.

11. The method according to claim 7, wherein the determining the scene aperture value and the scene focal point value of the target virtual scene according to the relationship between the actual aperture value and the actual focal point value and the candidate aperture value and the candidate focal point value that are associated with the $i^{th}$ candidate focal length and the relationship between the actual aperture value and the actual focal point value and the candidate aperture value and the candidate focal point value that are associated with the $(i+1)^{th}$ candidate focal length comprises:

determining, based on that the actual aperture value is consistent with a $j^{th}$ candidate aperture value associated with the $i^{th}$ candidate focal length, the scene aperture value and the scene focal point value of the target virtual scene according to a relationship between the actual focal point value and a candidate focal point value associated with the $j^{th}$ candidate aperture value associated with the $i^{th}$ candidate focal length and a relationship between the actual focal point value and a candidate focal point value associated with a $j^{th}$ candidate aperture value associated with the $(i+1)^{th}$ candidate focal length; or determining, based on that the actual aperture value is between a $j^{th}$ candidate aperture value and a $(j+1)^{th}$ candidate aperture value that are associated with the $i^{th}$ candidate focal length, the scene aperture value and the scene focal point value of the target virtual scene according to a relationship between the actual focal point value and candidate focal point values associated with the $j^{th}$ candidate aperture value and the $(j+1)^{th}$ candidate aperture value that are associated with the $i^{th}$ candidate focal length and a relationship between the actual focal point value and candidate focal point values associated with a $j^{th}$ candidate aperture value and a $(j+1)^{th}$ candidate aperture value that are associated with the $(i+1)^{th}$ candidate focal length, wherein j is a positive integer less than N.

12. The method according to claim 11, wherein the determining the scene aperture value and the scene focal point value of the target virtual scene according to a relationship between the actual focal point value and the candidate focal point value associated with the $j^{th}$ candidate aperture value associated with the $i^{th}$ candidate focal length and the relationship between the actual focal point value and the candidate focal point value associated with the $j^{th}$ candidate aperture value associated with the $(i+1)^{th}$ candidate focal length comprises:

calculating, based on that the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value associated with the $i^{th}$ candidate focal length, and a virtual aperture value and a virtual focal point value that correspond to a $k^{th}$ candidate focal point value associated with the $j^{th}$ candidate aperture value associated with the $(i+1)^{th}$ candidate focal length; or calculating, based on that the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value and the $(k+1)^{th}$ candidate focal point value that are associated with the $j^{th}$ candidate aperture value associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value associated with the $(i+1)^{th}$ candidate focal length, wherein k is a positive integer less than P.

13. The method according to claim 11, wherein the determining the scene aperture value and the scene focal point value of the target virtual scene according to the relationship between the actual focal point value and candidate focal point values associated with the $j^{th}$ candidate aperture value and the $(j+1)^{th}$ candidate aperture value that are associated with the $i^{th}$ candidate focal length and the relationship between the actual focal point value and candidate focal point values associated with the $j^{th}$ candidate focal point value and the $(j+1)^{th}$ candidate focal point value that are associated with the $(i+1)^{th}$ candidate focal length comprises:

calculating, based on that the actual focal point value is consistent with a $k^{th}$ candidate focal point value associated with the $j^{th}$ candidate aperture value associated with the $i^{th}$ candidate focal length, a scene aperture value and a scene focal point value of the target virtual scene according to a virtual aperture value and a virtual focal point value that correspond to the $k^{th}$ candidate focal point value associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value associated with the $j^{th}$ candidate aperture value and the $(j+1)^{th}$ candidate aperture value that are associated with the $(i+1)^{th}$ candidate focal length; or calculating, based on that the actual focal point value is between a $k^{th}$ candidate focal point value and a $(k+1)^{th}$ candidate focal point value that are associated with the $j^{th}$ candidate aperture value associated with the $i^{th}$ candidate focal length, a scene aperture value and a scene focal point value of the target virtual scene according to a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $i^{th}$ candidate focal length, and a virtual aperture value and a virtual focal point value that correspond to a $k^{th}$ candidate focal point value and a $(k+1)^{th}$ candidate focal point value that are associated with the $j^{th}$ candidate aperture value and the $(j+1)^{th}$ candidate aperture value that are associated with the $(i+1)^{th}$ candidate focal length, wherein k is a positive integer less than P.

14. The method according to claim 1, wherein the camera is a video camera.

15. A computing device, comprising:

one or more processors; and memory storing instructions, when executed by the one or more processors, cause the computing device to:

obtain photographing parameters of a camera, wherein the photographing parameters of the camera are set in real time on the camera and are configured for photographing a fused picture of a real scene and virtual content displayed on a display device;

determine, based on the photographing parameters of the camera and a reference dataset, target virtual scene parameters corresponding to virtual content to be photographed by the camera, the reference dataset comprising a correspondence between reference photographing parameters and virtual scene parameters;

display the virtual content according to the target virtual scene parameters; and cause the camera to photograph the fused picture of the real scene and the virtual content displayed on the display device.

16. The computing device according to claim 15, wherein the reference photographing parameters are configured for describing photographing parameters of a reference camera, and the virtual scene parameters are configured to describe photographing parameters of a virtual camera in a virtual scene.

17. A non-transitory computer-readable storage medium storing instructions, when executed, cause:

obtaining photographing parameters of a camera, wherein the photographing parameters of the camera are set in real time on the camera and are configured for photographing a fused picture of a real scene and virtual content displayed on a display device;

determining, based on the photographing parameters of the camera and a reference dataset, target virtual scene parameters corresponding to virtual content to be photographed by the camera, the reference dataset comprising a correspondence between reference photographing parameters and virtual scene parameters;

displaying the virtual content according to the target virtual scene parameters; and causing the camera to photograph the fused picture of the real scene and the virtual content displayed on the display device.

* * * * *